United States Patent [19]

Crowley et al.

[11] 4,073,373
[45] Feb. 14, 1978

[54] LAMINATE STACKING APPARATUS AND METHOD

[76] Inventors: Norman R. Crowley, 2 W. Sunrise Drive, Evansville, Ind. 47710; Charles M. Walker, P.O. Box 3436, Evansville, Ind. 47733

[21] Appl. No.: 670,739

[22] Filed: Mar. 26, 1976

[51] Int. Cl.² ............................................ B65G 57/00
[52] U.S. Cl. .................................. 198/421; 198/422; 198/616; 198/774; 29/738; 29/742; 221/223; 221/267
[58] Field of Search ...................... 198/35, 37, 39, 219, 198/419–422, 487, 540, 550, 616, 774, 575, 526, 530–532; 214/6 R, 6 F, 6.5, 8.5 R, 8.5 SS, 6 M; 271/9, 262, 263, 131, 133; 270/58; 93/93 R, 93 DP, 93 HT; 29/204, 205 R, 203 L, 596, 609, 730, 732, 733, 738, 742, 783, 822; 221/92, 93, 112, 123, 124, 131, 200, 221, 223, 267, 307–310

[56] References Cited

U.S. PATENT DOCUMENTS

| | | | |
|---|---|---|---|
| 1,490,773 | 4/1924 | Gunn | 271/131 |
| 2,702,189 | 2/1955 | Zugel et al. | 271/263 |
| 2,748,417 | 6/1956 | Heim | 270/58 |
| 3,007,591 | 11/1961 | Sundblad | 198/39 |
| 3,187,883 | 6/1965 | Umbricht | 198/219 |
| 3,189,984 | 6/1965 | Haifley et al. | 29/205 R |
| 3,488,693 | 1/1970 | Brinkmeier | 214/6.5 |
| 3,618,933 | 11/1971 | Roggenstein | 271/126 |
| 3,752,043 | 8/1973 | Rapparlie et al. | 93/93 DP |
| 3,799,321 | 3/1974 | Agui | 198/35 |
| 3,967,358 | 7/1976 | Orlando | 198/35 |

*Primary Examiner*—Johnny D. Cherry
*Assistant Examiner*—Joseph E. Valenza
*Attorney, Agent, or Firm*—Larson, Taylor and Hinds

[57] ABSTRACT

Apparatus and a method for assembling a stack having a precise height from a plurality of individual laminates having varying thicknesses are disclosed. In a preferred embodiment, the apparatus comprises seven colinearly aligned dispensing stations for storing a stack of laminates and for dispensing a predetermined number of laminates from the first six stations and a variable number of laminates in the last seventh station; three walking beam assemblies for transporting the plates between the dispensing stations, and a means for controlling the number of laminates dispensed by the last, seventh dispensing station. The controlling means comprises a vertically extending engaging block resiliently mounted on the third walking beam for engaging the laminates to be dispensed and a resiliently mounted cut-off blade depending into and varying the height of a slot located at the bottom of the stored stack of laminates in the last dispensing station.

40 Claims, 18 Drawing Figures

LAMINATE STACKING APPARATUS AND METHOD

BACKGROUND OF THE INVENTION

1. Field of the Invention

This invention relates to a method and apparatus for stacking a plurality of individual plates and more precisely an apparatus and method for making a stack of plates having a precise height from a plurality of individual plates having varying thicknesses and uneven distribution of thickness throughout the plates.

2. Description of the Prior Art

There are many diverse arts from battery making to motor and generator making which require the assembly of a plurality of plates or laminates into groups or stacks. Depending on the application, the importance of the tolerances of both the thickness of the individual laminates and the overall height of the finished stack can vary from being unimportant to being very critical. In applications where the laminates are being assembled to build the alternator of a motor, the thickness tolerances of the individual laminates can be relatively large, but the tolerances for the overall stack height are very small.

Because the individual laminates for an alternator do not need precision tolerances, the individual laminates can be manufactured quite inexpensively with tolerances as large as 0.008 inches and with an uneven distribution of thickness throughout the plates. Normally, two different types of laminates are used in building the alternator stator, a thinner smaller diameter laminate having a thickness of one-half millimeter and a slightly thicker, slightly larger diameter laminate having a thickness of one millimeter.

The only previously known method of assembling a plurality of varying thickness laminates into a stack having a precise height was to manually select an appropriate number of laminates and to measure and adjust the total height of the stack such that it would be exactly one inch. In practice it was found that the laminates were manufactured such that the uneven distribution of thickness was generally the same for each laminate. Thus if all of the laminates were assembled in the stack with the same orientation, the overall height of the stack would vary depending upon the location where the measurement was taken. The stack was usually leveled by simply stacking one-half of the laminates in a first orientation and stacking the remaining laminates in a second orientation rotated 180° from the first orientation.

Obviously, the manual method of producing a stack of laminates that were precisely a certain height was slow, costly and occasionally inaccurate. Any known stacking machines disclosed in the prior art could not be used since they did not provide for producing a stack having a critical height. Many of the prior art devices used for assembling storage battery elements, such as those disclosed in U.S. Pat. Nos. 2,626,038 to Smith, and 2,680,510 to Donath were comprised of a plurality of stations containing a stack of laminates and a means for individually dispensing the laminates on the top of a pile being formed. In the Smith patent, vacuum means pick up the top laminate in the stack and place it on top of a pile of laminates being conveyed past the stations by an endless belt conveyor. In the Donath patent, individual battery plates are released and dropped from the bottom of a dispensing magazine onto an intermittently operated endless belt conveyor. Although the devices disclosed in the battery assembling apparatus could produce a pile of laminates having a precise number of laminates, they were not capable of measuring the height of the pile of laminates and varying the height by adding or subtracting laminates therefrom to produce a pile having a precise height. In addition, assembling apparatus using vacuum means were generally very noisy, expensive, susceptible to frequent breakdowns or to inadvertently dropping a laminate at the wrong location.

SUMMARY OF THE INVENTION

The present invention overcomes the aforementioned disadvantages and difficulties of the prior art devices and methods. More particularly, the present invention provides a method and apparatus for making a stack having a precise height from a plurality of individual laminates. The present invention eliminates the need for manually stacking and manually measuring and adjusting the height of a stack of laminates to a precise, predetermined height. A device in accordance with the present invention is quiet, very reliable, relatively inexpensive to manufacture and to operate, efficient and accurate, and capable of operating at relatively high speeds.

An apparatus in accordance with the present invention for assembling a stack of a plurality of individual plates wherein the stack has a precise height and the individual plates have varying thicknesses and uneven distribution of thickness throughout the plate comprises a plurality of plate dispensing stations including a first dispensing station and a last dispensing station. Transporting means serially transports a stack of plates between the plurality of stations and receives and adds to the stack of plates additional plates from the stations. The apparatus also comprises means for controlling a number of plates added by the last dispensing station for producing a stack having a predetermined height.

The method according to the present invention mechanically and automatically assembles a stack having a precise height from a plurality of individual plates having varying thicknesses and uneven distribution of thicknesses throughout the plate. The method comprises the steps of dispensing a predetermined number of plates having a first orientation in a vertical stack from a first dispensing station and serially transporting the stack of plates to at least one intermediate station. A predetermined number of plates are dispensed from each intermediate station onto the stack transported thereto and this stack is then transported to the last dispensing station. At the last dispensing station, the number of plates that must be dispensed therefrom to precisely produce a stack having a predetermined height is determined and the determined number of plates are dispensed and added in a second orientation to the stack of plates transported from the intermediate station.

In accordance with one specific embodiment of the invention, the plates are dispensed from the bottom of a vertical stack of plates stored at the dispensing station. This further, specific embodiment of the invention provides the additional advantage of providing for replenishment of the stack without interrupting or interfering with the dispensing operation.

Other features, objects, and advantages of the present invention will be discussed in or are apparent from the detailed description of the presently preferred embodiment of the invention located hereinbelow.

DETAILED DESCRIPTION OF THE PREFERRED EMBODIMENT

I. In General

Figure 1:
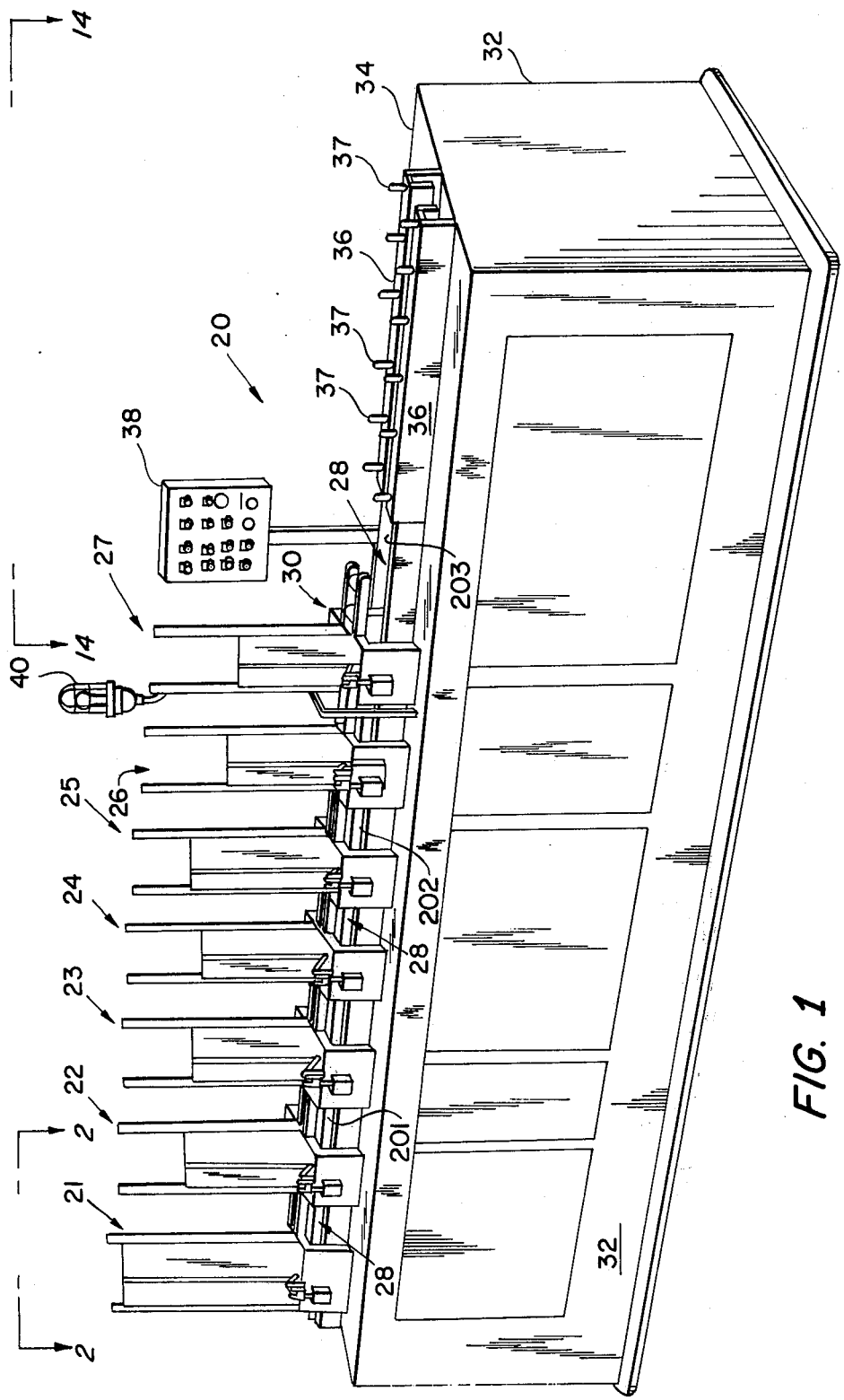
FIG. 1 is a perspective view of a laminate stacking apparatus according to the invention and which embodies seven laminate dispensing stations.

With reference to the drawings, where like numerals refer to like elements in the several views, a laminate stacking machine in accordance with a presently preferred embodiment of the invention is denoted 20. Stacking machine 20 is a specific embodiment of the invention for assembling a plurality of individual plates or laminates into a stack having a precise height.

Stacking machine 20 comprises a plurality of laminate dispensing stations consisting of a first laminate dispensing station 21, second through six intermediate laminate dispensing stations denoted 22 through 26, respectively, and a last laminate dispensing station 27. Stacking machine 20 further comprises a walking beam apparatus 28 for serially transporting a stack of plates between dispensing stations 21 through 27 and for receiving and adding to the stack of plates additional plates from the dispensing station to which the stack is conveyed, and a controlling means generally denoted 30 located at the last dispensing station 27 for controlling the number of laminates added by dispensing station 27 so as to produce a stack of laminates which has a precise, predetermined height.

The laminate dispensing stations are colinearly aligned on and supported by a support table 32 which also supports walking beam apparatus 28 in a position below the dispensing stations. Walking beam apparatus 28 conveys the finished stack of laminates from last dispensing station 27 to a delivery end 34 of support table 32. Mounted on delivery end 34 of support table 32 are a pair of spaced rails 36 supporting pairs of vertically extending locator pins 37 for receiving a completed stack deposited thereon by walking beam apparatus 28 and for maintaining the alignment of the individual laminates in the stack.

Conventional operating panels and indicating means are associated with stacking machine 20 so as to provide for the operation and monitoring thereof. An indication panel 38 and individual indicating lamps, only one of which is depicted at 40, are mounted on support table 32 to indicate normal and abnormal operation of stacking machine 20 and to indicate a low supply level of laminates in a dispensing station, respectively. A photoelectric sensing device 42 mounted with bracket 44 to each dispensing station monitors the supply of laminates stored in the particular dispensing station. Upon a low supply level of laminates, device 42 transmits a signal that results in the lighting of lamp 40.

II. Dispensing Stations

Figure 3:
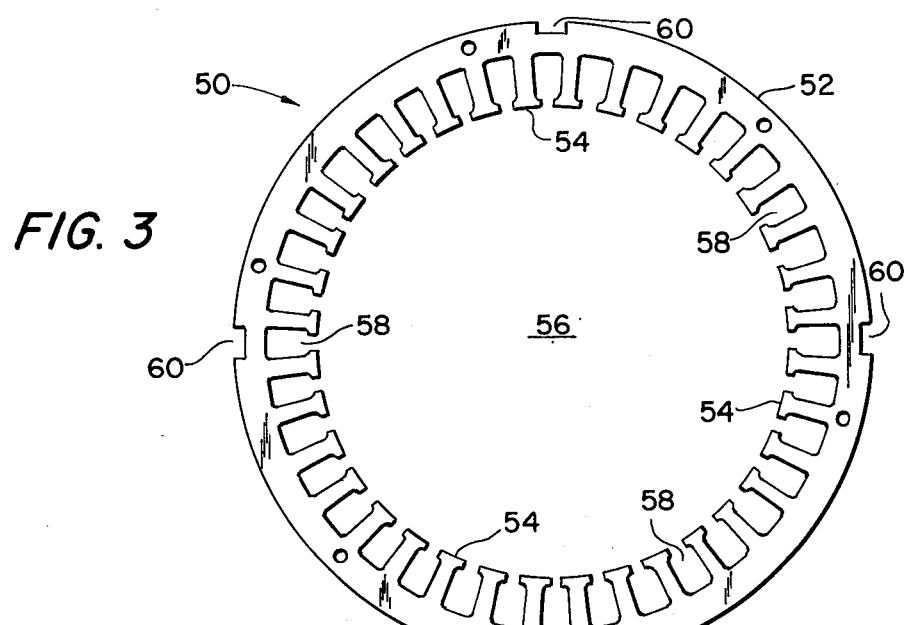
FIG. 3 is a top plan view of a laminate or plate used for making a stator of an alternator and which is stacked by the embodiment of the invention shown in FIG. 1.

As mentioned above, stacking machine 20 is comprised of seven dispensing stations number 21 through 27. The presently described embodiment of the invention which is depicted in the several views accomplishes the specific function of assembling an unknown number of laminates used for making the stator of an alternator. The particular stator being assembled is comprised of a central section of laminates that are slightly thicker and have a slightly larger diameter than the plurality of laminates on either end. A typical, thin plate or laminate used in making the stator is depicted in FIG. 3 and is denoted 50. Laminate 50 is comprised of an annular metal disk that has an outer circumferential edge 52 with a plurality of radially inwardly protruding "T" shaped poles 54 integral with edge 52. The innermost ends of poles 54 define a central opening 56 and the radial edges of adjacent poles 54 define a plurality of side openings 58. Located around the circumference of edge 52 are four slots 60, spaced exactly 90° apart. The maximum height of the stack of laminates forming this particular stator must be precisely one inch. When assembling the stators manually, it was found that when using laminates that are commercially available, a stator having a height of one inch could be assembled using five larger and thicker laminates for the central section, twelve smaller and thinner laminates for one side and from twelve to seventeen of the smaller, thinner lamintes for the other side. Accordingly, the disclosed embodiment of the invention assembles the stack by adding a precise number of laminates from stations 21 through 26 and varying the number of laminates needed in dispensing station 27. More precisely, dispensing stations 21 through 24 each add three of the thinner and smaller laminates, dispensing stations 5 and 6 add 3 and 2, respectively, of the larger and thicker laminates, and the seventh station adds from twelve to seventeen of the smaller and thinner laminates. Thus, except for differences described hereinbelow, each of the dispensing stations are similar in structure and function. Accordingly, only dispensing station 21, the first station, and laminate dispensing station 27, the last dispensing station will be described in detail, it being expressly understood that the remaining, intermediate stations are similar.

Figure 2:
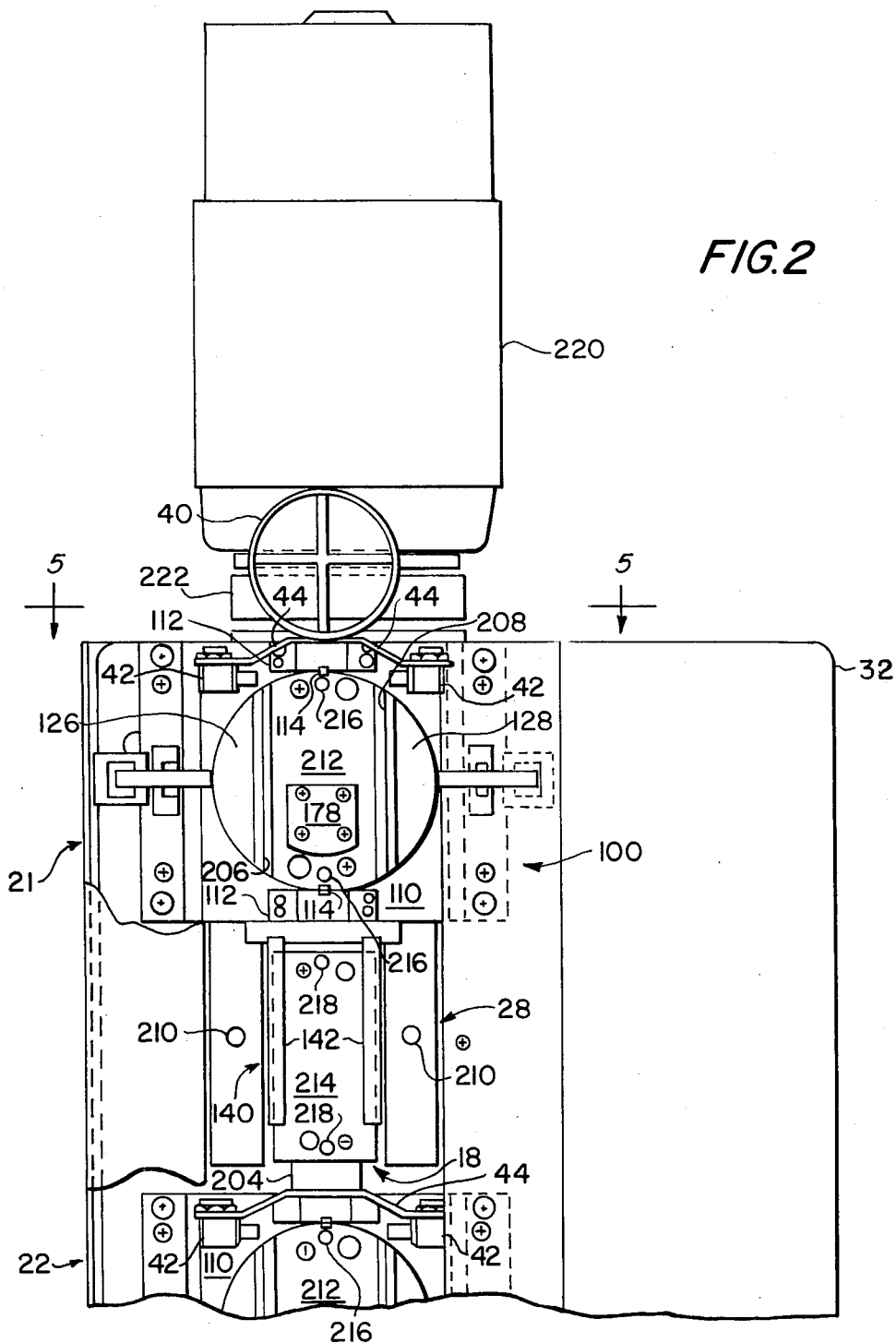
FIG. 2 is a top plan view taken along line 2—2 of FIG. 1.
Figure 4:
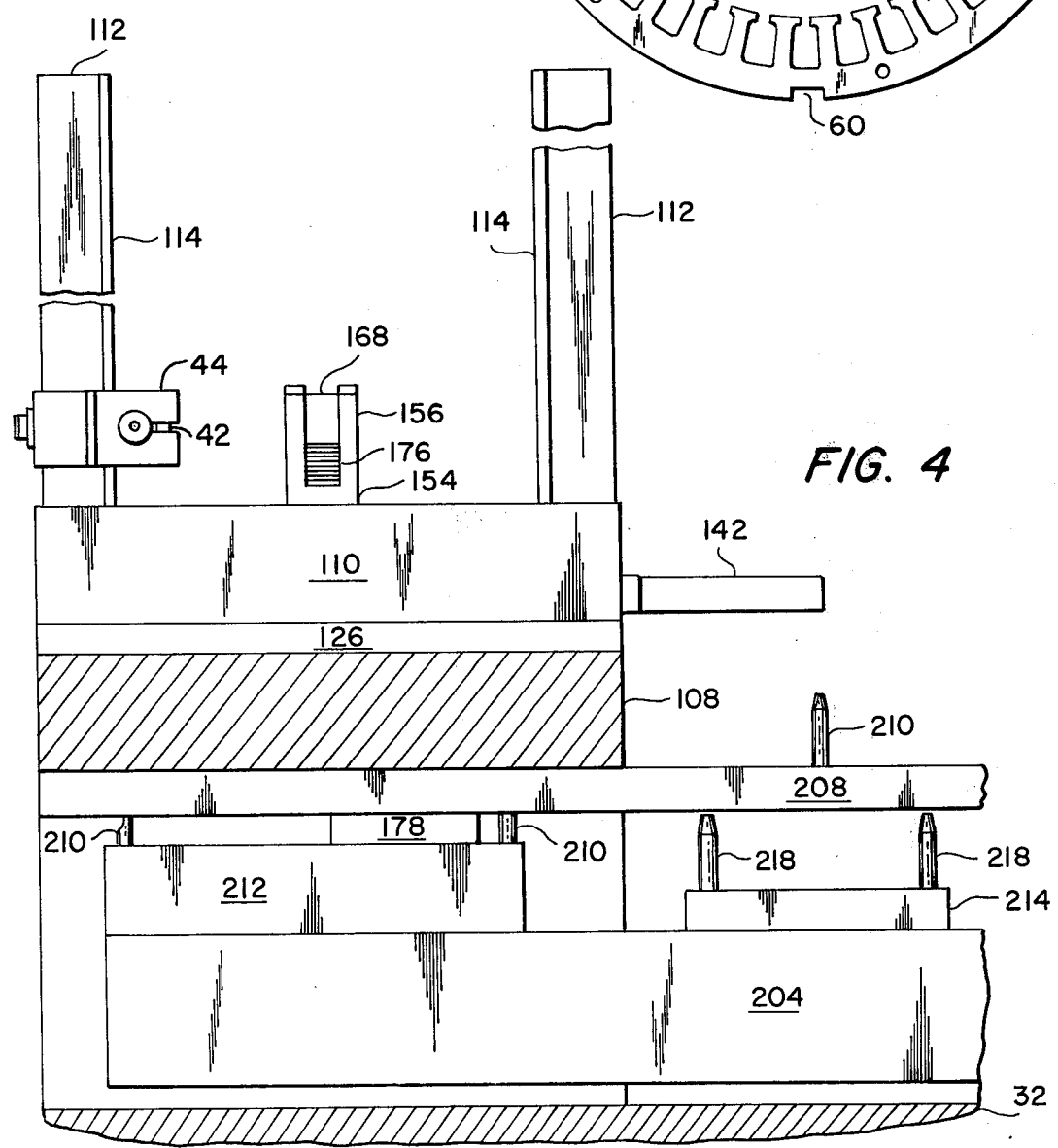
FIG. 4 is a side elevation view, with parts removed, of one laminate dispensing station, taken along line 4—4 in FIG. 5.
Figure 5:
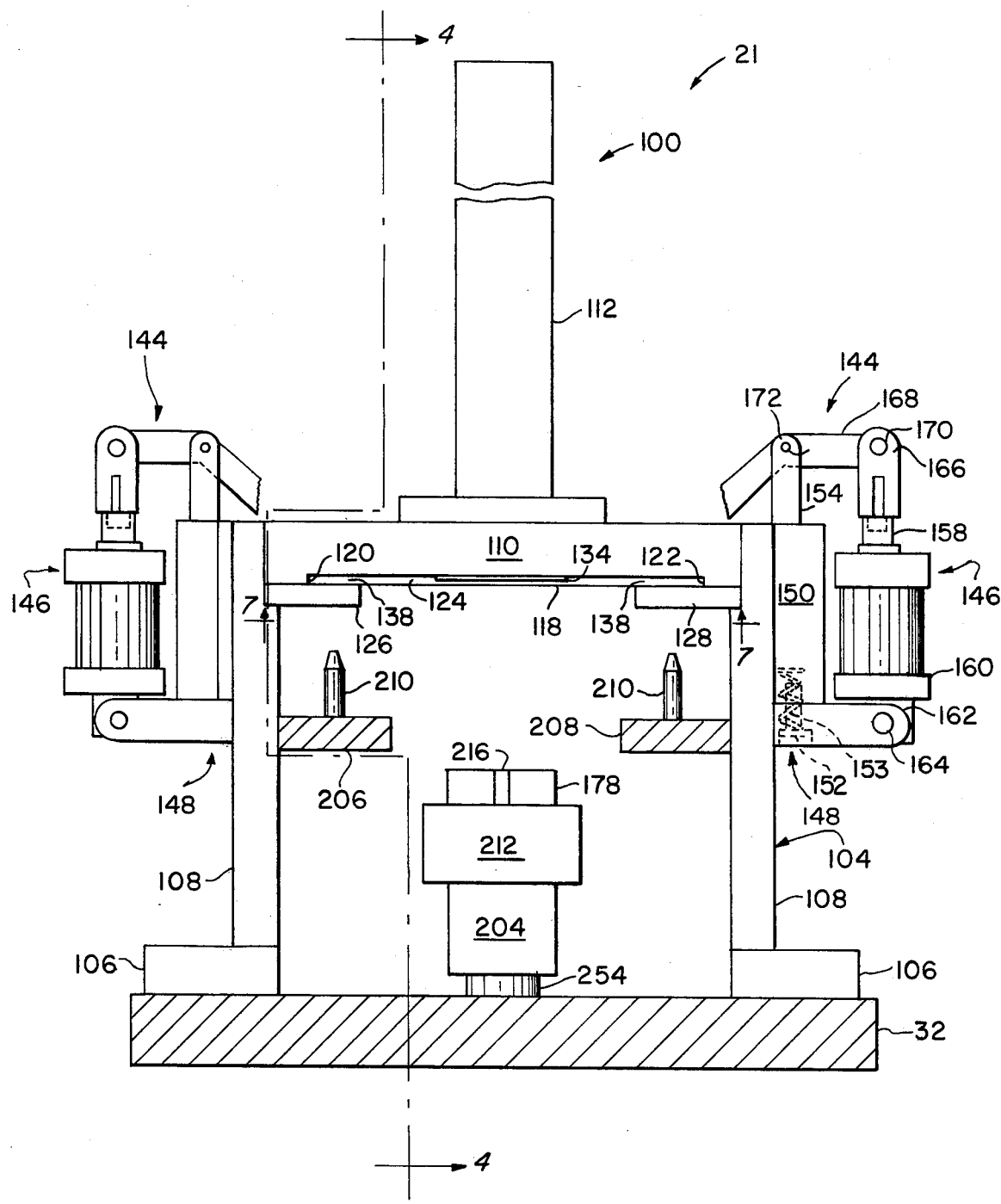
FIG. 5 is an end cross sectional elevation view taken along line 5—5 in FIG. 2 and shows the first laminate dispensing station.

With reference now to FIGS. 2, 4, and 5, dispensing station 21 comprises a magazine 100 for storing a vertical colinear stack of a plurality of laminates 50 and a means 102 for dispensing a predetermined number of laminates 50 from the bottom of the stack onto the transporting means.

Magazine 100 comprises an inverted U-shaped base 104 mounted on top of table 32. Base 104 includes a pair of elongated horizontally extending foot plates 106 which are rigidly fastened by screws to the top of support table 32, two parallel vertically extending side plates 108 mounted at their respective lower ends to the corresponding foot plate 106, and a base plate 110 rigidly mounted to the other ends of side plates 108 and extending therebetween so as to form the base of the inverted U-shaped base 104. Magazine 100 further comprises two vertically extending stanchions 112 rigidly mounted at their respective lower ends to the top side of base plate 110. Mounted to the inward side of each stanchion 112 is an elongated key 114 for engaging one of slots 60 in laminate 50 (FIG. 3). Thus, laminates 50 are stored in a substantially colinear stack in magazine 100, with keys 114 engaging opposite slots 60 of each laminate 50.

Figure 8:
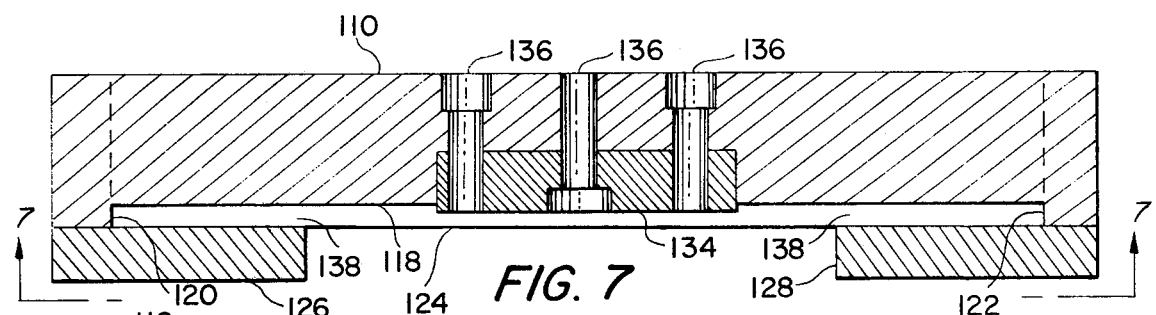
FIG. 8 is an end cross sectional elevational view taken along lines 8—8 of FIG. 7.
Figure 7:
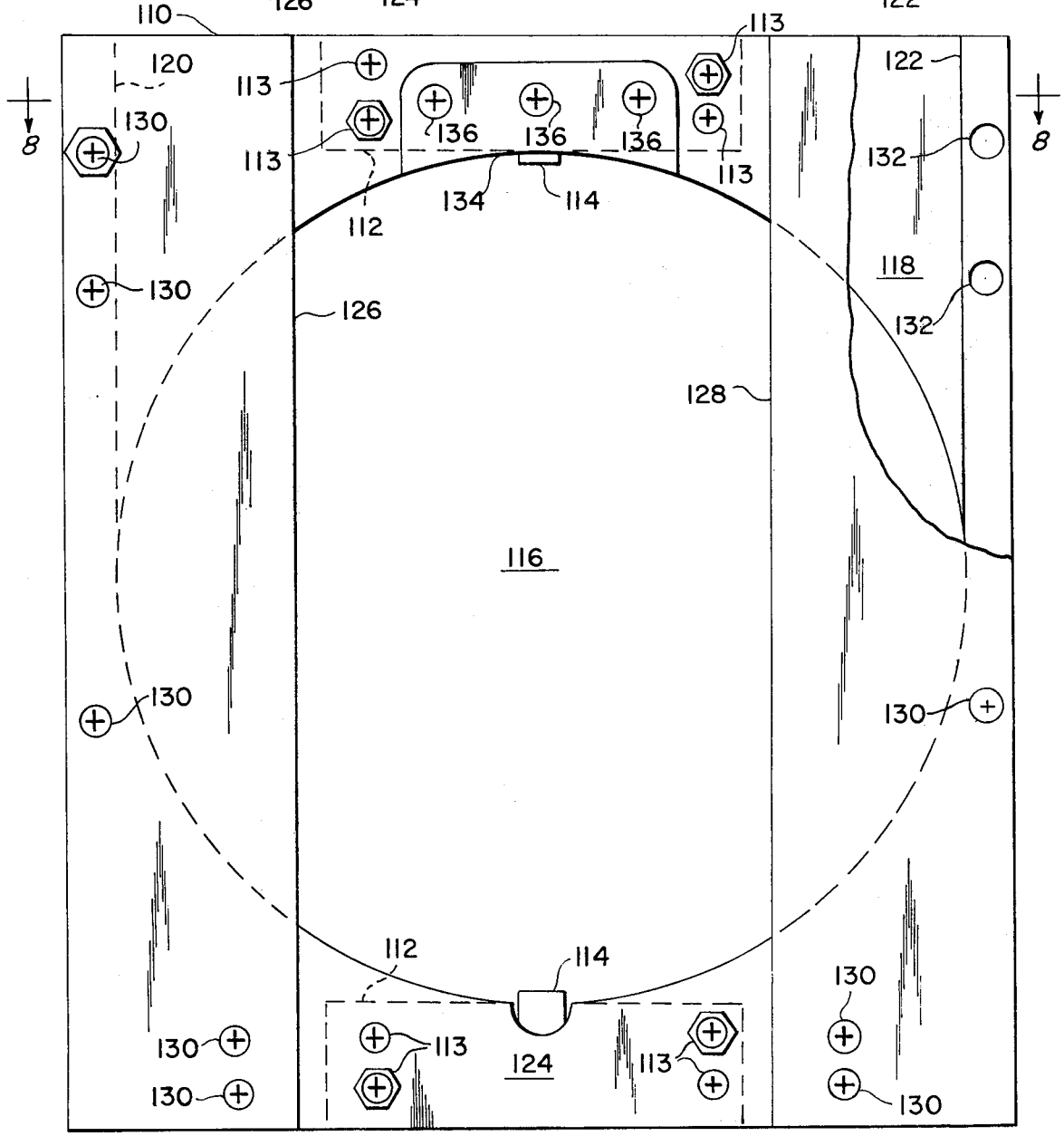
FIG. 7 is a transverse cross sectional view showing the laminate and cut-off means of the first dispensing station, taken along lines 7—7 of FIG. 5 in the direction of arrows 7.

With particular reference to FIGS. 5, 7 and 8, it can be seen that base plate 110 has a generally rectangular shape in plan view and contains a large central orifice 116 therein. The diameter of orifice 116 is slightly larger than the diameter of laminates 50, thereby permitting the stack of laminates to pass therethrough. A bottom section 118 of base plate 110 is recessed between lines tangent to each side of orifice 116 forwardly to the edge of base plate 110, thereby forming two longitudinally extending guide rails 120 and 122 and a rear guide plate 124, all integral with base plate 110 and all having the lower surfaces thereof coplanar with the lower surface of base plate 110. Two longitudinally extending, horizontal support bars 126 and 128 for supporting the stack of laminates 50 are rigidly mounted along either side of base plate 110 to guide rails 120 and 122. Support bars 126 and 128 can be secured to base plate 110 with mounting means such as threaded bolts 130 inserted into corresponding, mating threaded bores 132 in base plate 110. A cut-off blade 134, comprised of a very hard metal, is rigidly mounted with bolts 136 in a deeper recess in the recessed bottom section 118 of base plate 110. As best depicted in FIG. 8, cut-off blade 134 extends slightly below the bottom of recessed bottom section 118 of base plate 110. Thus, support bars 124 and 126 and bottom section 118 define a slot 138 through which a predetermined number of laminates 50 can be dispensed from the bottom of the stack of laminates. Guide rails 120 and 122, and guide plate 124 prevent the bottom laminates from moving laterally or rearwardly, respectively and cut-off blade 134 prevents more than the predetermined number of laminates from being dispensed.

Figure 9:
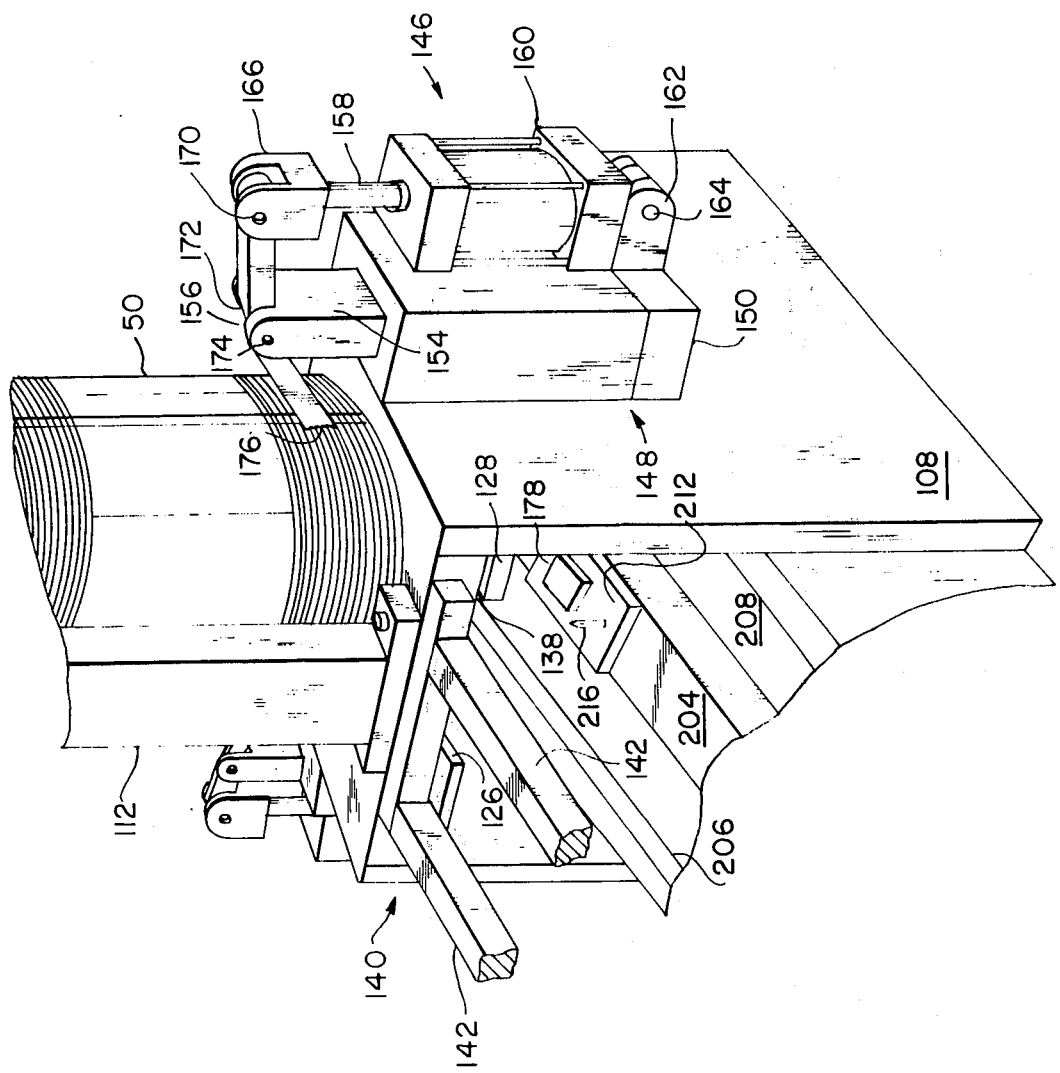
FIG. 9 is a perspective view, with parts removed, of a laminate urging means and laminate leveling means of one of the first six stations.

Extending horizontally forwardly from and mounted on base plate 110 is a laminate leveling and guiding means 140 for keeping the uppermost laminates being dispensed and fed through slot 138 in a substantially horizontal plane and from spreading apart from the other laminates being dispensed. As shown in FIGS. 2, 4 and 9, leveling and guiding means 140 comprises two elongate members 142 rigidly mounted at the rearward end to the forward end of base plate 110 and extending horizontally therefrom parallel to the top of support table 32. The lower surface of members 142 are substantially planar for permitting the uppermost laminate being dispensed to engage therewith and slide therealong.

The pile of laminates 50 being stored in magazine 100 are positively urged downwardly by two laminate pressure assemblies 144 mounted on corresponding side plates 108. Referring to FIGS. 5 and 9, each pressure assembly 144 comprises a double actuated fluid piston assembly 146, a fulcrum assembly 148 and a plate engaging member resiliently mounted to fulcrum assembly 148 and operated by piston assembly 146. Fulcrum assembly 148 includes a vertical, hollow housing 150 rigidly mounted along the back side thereof to side plate 108. A retaining pin 152 extending upwardly through the bottom of housing 150 into the hollow inner portion thereof has a coil spring 153 mounted thereon. A support slide or fulcrum block 154 is slidably received inside housing 150 and is resiliently engaged by spring 153 at the lower end of fulcrum block 154. The other end 156 of fulcrum block 154 is biforcated to form an integral yoke.

In a presently preferred embodiment, piston assembly is pneumatically actuated and includes a vertically extending piston 158 and a cylinder 160 pivotably mounted at the lower end thereof to a horizontally extending yoke 162 with a pin 164. Yoke 162 is rigidly mounted to the lower end of fulcrum assembly housing 150. Rigidly secured to the upper end of piston 158 is a second or piston yoke 166. A substantially arcuate or angular lever arm 168 is pivotably mounted at one end to piston yoke 166 with a mounting pin 170. Lever arm 168 is also pivotably mounted at a centrally located fulcrum or vertex 172 to biforcated end 156 of fulcrum block 154 with a second mounting pin 174. The other end 176 of lever arm 168 engages the stored laminates 50. To permit improved frictional engagement with laminates 50, end 176 of lever arm 168 has a sawtooth or roughened edge.

The operation of laminate pressure assembly 144 is as follows. Immediately prior to dispensing means 102 engaging the predetermined number of laminates 50 to be dispensed, air is admitted to cylinder 160 on the lower side of piston 158, at the same time air is vented from the upper side of piston 158, thereby forcing piston 158 upwardly. The instant piston 158 begins to move upwardly, the downward force on fulcrum block 154 is removed and spring 153 forces fulcrum block 154, and hence the vertex 172 of lever arm 168, upwardly. However, since piston 158, and hence the piston connected end of lever arm 168, moves upwardly at a faster rate than the vertex 172 of lever arm 168, the roughened end 176 thereof is moved downward and out of engagement with laminates 50. Thus, fulcrum block 154 is permitted to move upwardly the maximum vertical extension of spring 153. A few seconds after air is admitted to the lower end of piston 158, the air sequence is reversed and the lower end of piston 158 is vented and the upper end of piston 158 is pressurized with air. As piston 158 is forced downward, lever arm 168 is pivoted about vertex 172 and roughened end 176 engages the stack laminates. Further downward movement of piston 158 is now prevented through the engagement of roughened end 176 with laminates 50. Nevertheless, a downward force is applied to the stack of laminates which are urged in a downward direction. After the bottommost laminates have been dispensed, the air pressure on the top of piston 158 forces the end of lever arm 168 attached thereto downwardly and the entire lever arm 168, prevented from rotating about pin 174 by the engagement of roughened end 176 with laminates 50, is forced downwardly against spring 153 and the resiliently mounted fulcrum block 154.

Figure 6:
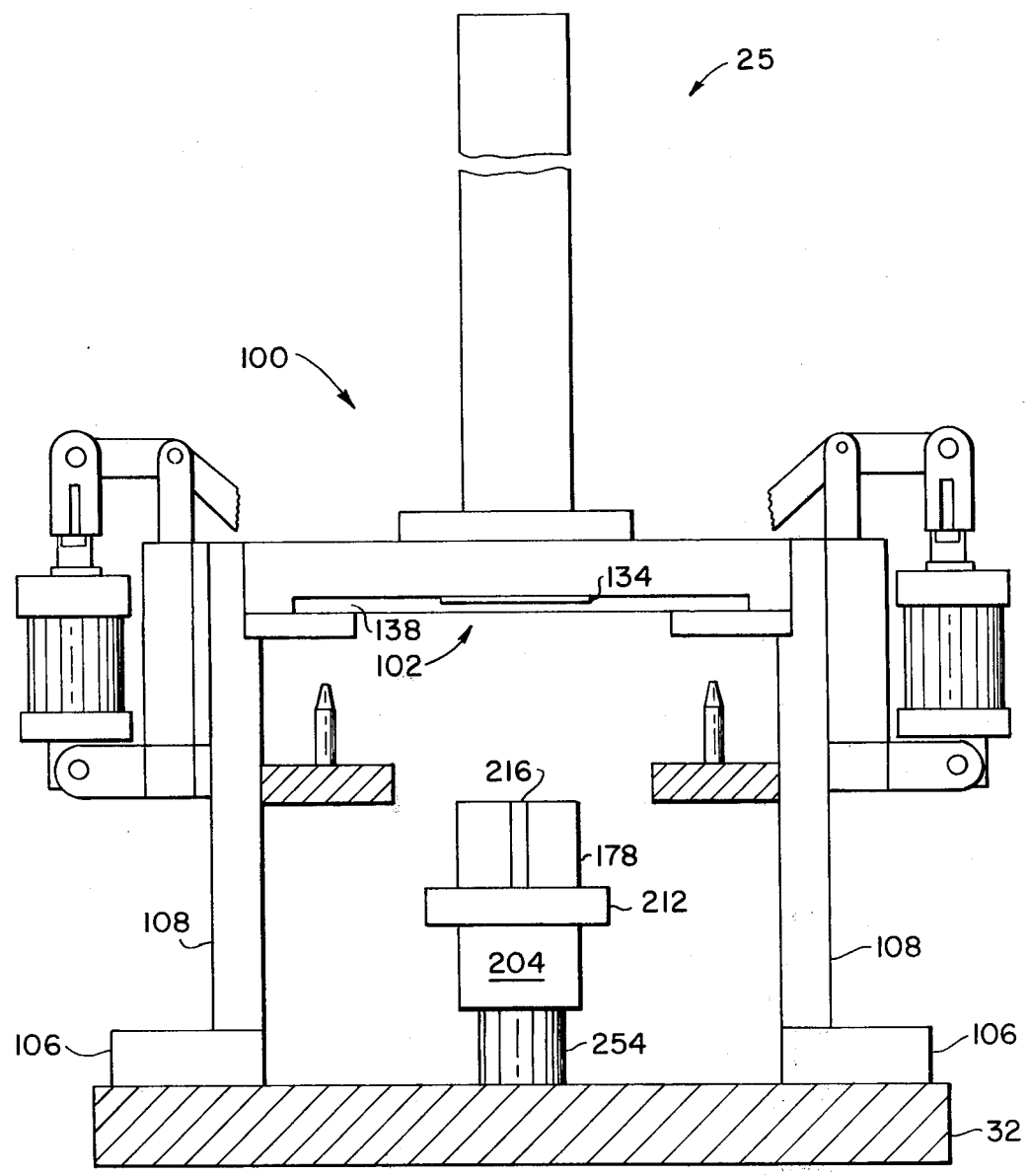
FIG. 6 is an end cross sectional elevational view, similar to FIG. 5, but showing station 5.

As mentioned above, dispensing station 21 is also comprised of a dispensing means 102. In the presently preferred embodiment, as shown in FIGS. 2, 5 and 6, dispensing means 102 is comprised of support bars 126 and 128 which define slot 138 at the bottom of magazine 100 and a discharging means, such as a die block 178, rigidly mounted onto the walking beam of walking beam apparatus 28. The maximum diameter of block 178 is smaller than the diameter of central orifice 56 of laminate 50. Block 178 of dispensing station 21, has a relatively small height with respect to the heights of the blocks 178 of the other dispensing stations because the latter blocks 178 have to accommodate the previously dispensed laminates. The height of block 178 is such that when block 178 is positioned by the walking beam apparatus 28 vertically upwardly inside the central orifices 56 of laminates 50, only the number of laminates to be dispensed by dispensing station 21 will be engaged by block 178. The operation of dispensing means is discussed hereinbelow with the operation of the walking beam apparatus.

The magazines of dispensing stations 22 through 26 are similar to magazine 100 of dispensing station 21 except that the height of the corresponding slots 138 is different for dispensing stations 25 and 26 and the corresponding central orifice 116 in the base plate has a larger diameter to accommodate the thicker and larger laminates dispensed therefrom.

III. Walking Beam Apparatus

As mentioned above, the stack of laminates is transported between dispensing stations by a walking beam apparatus 28. In general, walking beam apparatus comprises three longitudinally aligned, substantially similar walking beam assemblies 201, 202 and 203, (FIG. 1) and a walking beam moving means for generating movement in a generally rectangular path such that the movement when viewed in front elevation comprises in sequence an upward movement, a forward movement, a downward movement, and a rearward movement. Walking beam apparatus 28 also comprises a means for coordinating the movements of the walking beam assemblies so that all the assemblies operate together uniformly. Walking beam assemblies 201, 202 and 203, respectively, transport a stack of dispensed laminates between stations 1, 2, 3 and 4, between stations 4, 5, 6, and 7 and from station 7 to and along delivery end 34 of support table 32.

As best depicted in FIGS. 2, 5, 10 and 11, each walking beam assembly comprises a rectangularly movable walking beam 204 centrally located and movable between two parallel, spaced apart, stationary rails 206 and 208 rigidly secured to support table 32 and extending horizontally in the longitudinal direction. Longitudinally spaced and mounted on top of rails 206 and 208 and walking beam 204 are a plurality of laminate holding means for removably retaining a pile of laminates in vertical alignment while the laminates are resting on rails 206 and 208 and walking beam 204 respectively. The rail holding means comprise two sets of one pair of vertical rail guides or locator pins per dispensing station, a rearward pair 210 disposed directly under base plate 110 and a forward pair 211 located midway between dispensing stations. The pairs of rail locator pins are transversely aligned and spaced apart a distance such that the pins can receive opposite side openings 58 of laminates 50. The sets of rail locator pins are longitudinally spaced a distance apart equal to the longitudinal forward distance walking beam 204 is moved during each cycle of operation.

Two riser blocks, a rearward riser block 212 and a forward riser block 214, are rigidly mounted on each walking beam 204 of walking beam assemblies 201 and 202 per dispensing station. Thus, walking beam assemblies 201 and 202 include three pairs of riser blocks 212 and 214. Each riser block 212 and 214 mounts fore and aft longitudinally aligned locator pins, the front and rear pair of locator pins denoted 216 and 218, respectively, for engaging opposite front and rear side openings 58 of laminates 50. The rearward riser block 212 also rigidly supports die block 178 thereon. As a pile or stack of laminates is being formed and transported between dispensing stations, the stacks of laminates are cyclically supported, being first longitudinally supported by the rearward walking beam locator pins 216, then transversely supported by the rearward rail locator pins 210, next longitudinally supported by the forward walking beam locator pins 218 and finally transversely supported by the forward rail locator pins 211. The two sets of rail locator pins 210 and 211 and the two sets of beam locator pins 216 and 218 are located relative to each other such that when walking beam 204 is at its rearwardmost position, the rearward beam locator pins 216 are longitudinally spaced on either side of the rearward rail locator pins 210 and the forward beam locator pins are longitudinally spaced on either side of the forward rail locator pins 211. The spacing is such that imaginary lines connecting the locator pins mutually perpendicularly bisect each other. When walking beam 204 is at its forwardmost position, the rearward beam locator pins 216 are now positioned on either side of forward rail locator pins 211 and the forward beam locator pins 218 are now positioned on either side of the rear rail locator pins 210 of the next dispensing station. Naturally, in order for each walking beam assembly to be able to transport and transfer a stack of laminates to the next walking beam assembly, the upper surfaces of each set of rails 206 and 208 must be coplanar or have substantially the same vertical height and the rails must be in mutual longitudinal alignment.

The movements of the corresponding walking beam 204 in each of walking beam assemblies 201, 202 and 203 are coordinated such that all walking beams move uniformly together with the upper surfaces thereof maintained substantially coplanar by using a single drive motor 220 connected through a set of speed reduction gears 222 to a single, rotatably mounted cam shaft 224. Cam shaft 224, in turn, drives each walking beam moving means of each walking beam assembly.

Figure 10:
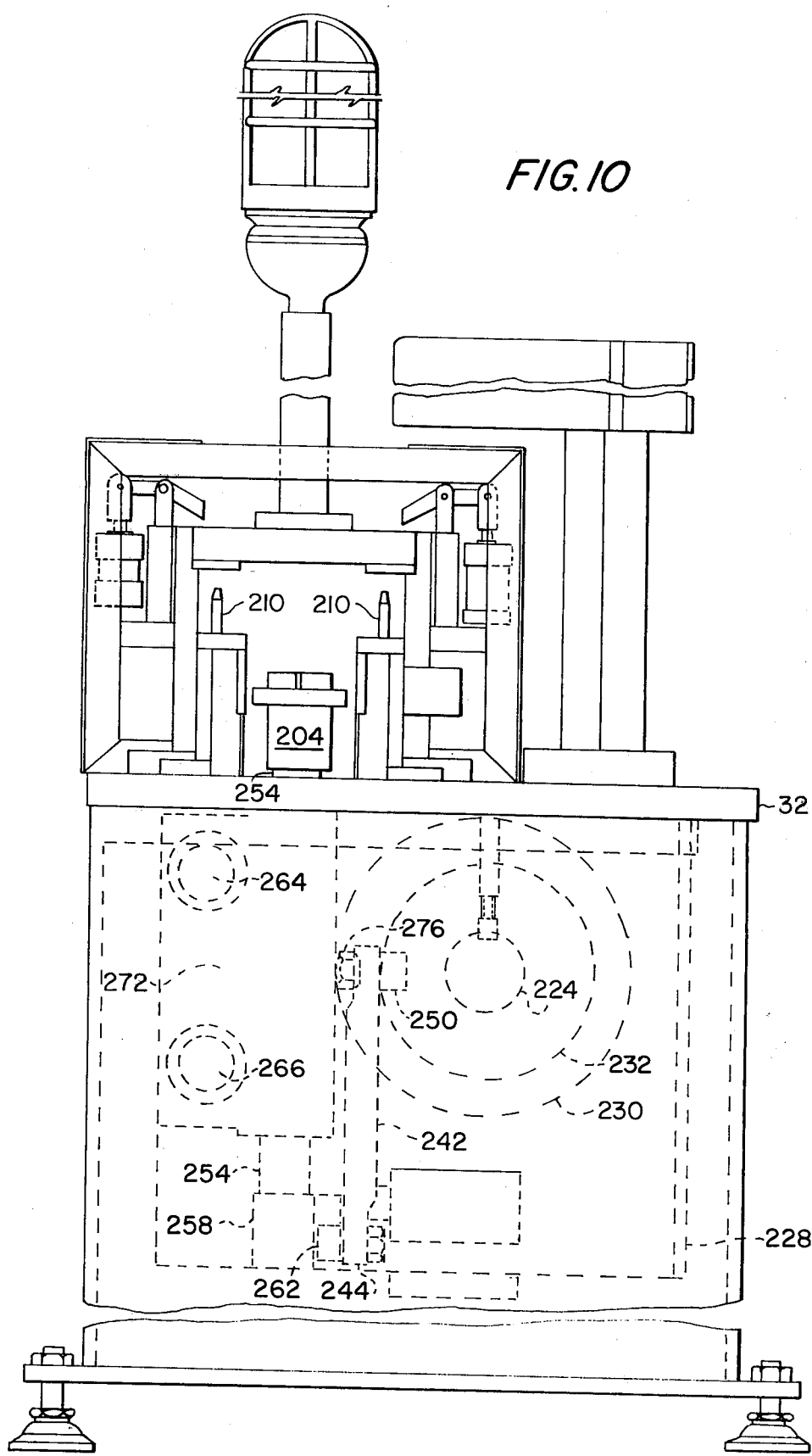
FIG. 10 is an end elevational view of the entire laminate stacking apparatus showing in phantom the moving means for moving a walking beam used to transport the pile of laminates between dispensing stations.
Figure 11:
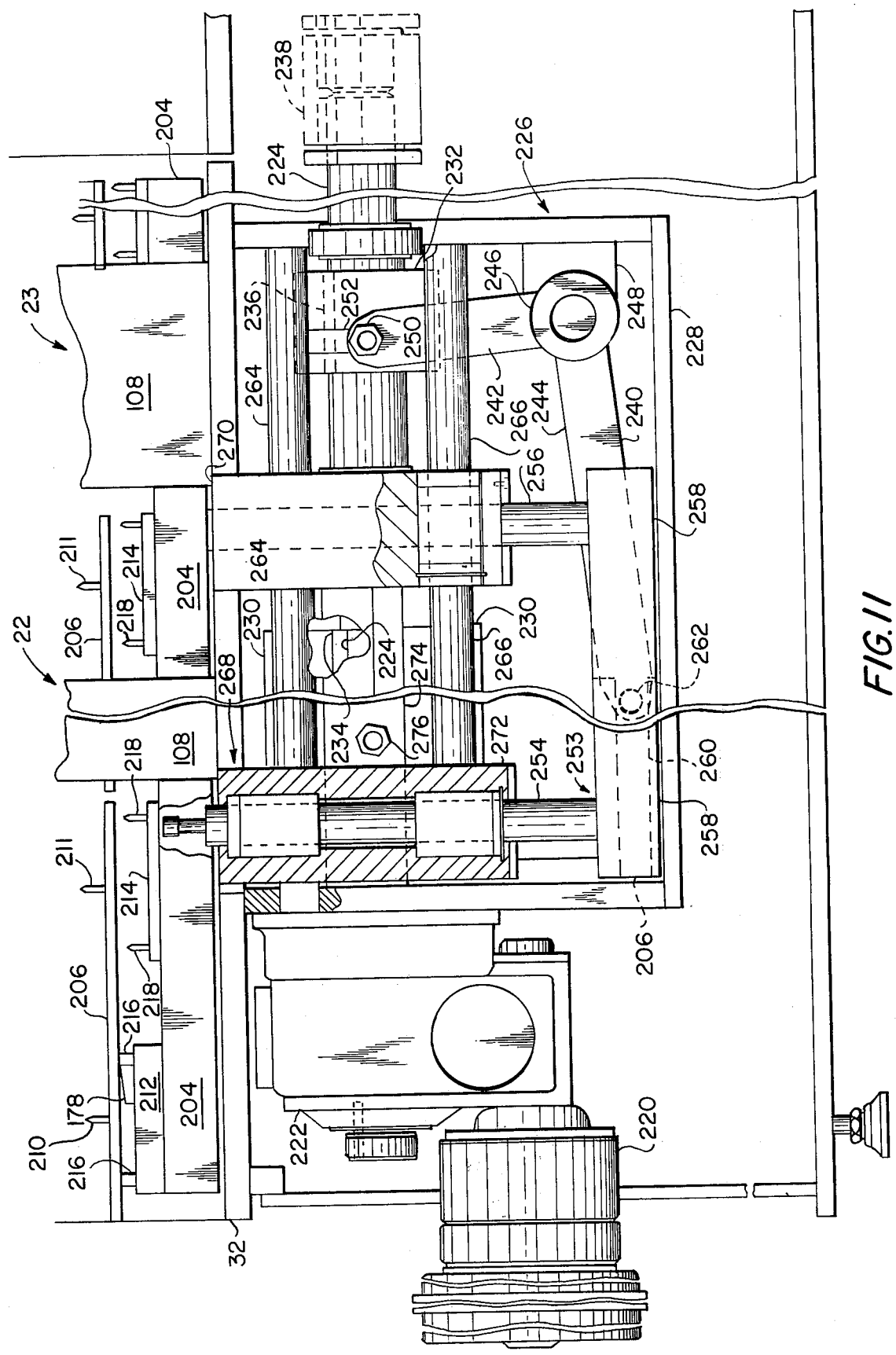
FIG. 11 is a side elevational view showing in detail the walking beam moving means.

Referring particularly to FIGS. 10 and 11, cam shaft 224 drives three similar walking beam cam assemblies, one cam assembly per walking beam assembly and only one of which is depicted at 226. Cam assembly 226 is contained in a housing 228 depending from and supported by support table 32. Each cam assembly 226 is comprised of one set of two cylindrical cams, a longitudinal cam 230 for reciprocally moving walking beam 204 in a longitudinal fore and aft direction and a vertical cam 232 for reciprocally moving walking beam 204 in a vertical up and down direction. Cams 230 and 232 are both keyed to cam shaft 224 for rotational movement therewith with keys 234 and 236, respectively. Cam shaft 224 is physically divided into three colinear sections which are coupled together with a flexible coupling 238 so as to permit limited relative movements between the cam assemblies 226.

A substantially angulated or L-shaped cam follower 240, having a short, generally vertical arm 242 and a long, generally horizontal arm 244 converts the rotational movement of cam 232 into a reciprocating, vertical movement of a precise vertical distance. Cam follower 240 is pivotably mounted at the vertex thereof in a bearing 246 mounted in a bearing block 248 which in turn is rigidly secured to housing 228. A follower guide 250 is transversely and securely mounted at the end of short arm 242 and engages a slot or cam groove 252 in cam 232.

Walking beam 204 is secured to and supported by a U-shaped connecting arm or frame 253 comprised of two vertical shafts 254 and 256 rigidly connected at the upper ends thereof to walking beam 204 and a bottom, longitudinally extending cam bar 258 rigidly connected to the lower ends of shafts 254 and 256. Cam bar 258 has a longitudinally extending cam slot 260 therein. A driver guide 262 is transversely and securely mounted at the end of long arm 244 of cam follower 240 and engages cam slot 260 in frame 253.

Two horizontal, vertically spaced apart, stationary cylindrical mounting shafts 264 and 266 are rigidly mounted at each end thereof to the forward and rearward ends of housing 228. A slide assembly 268, comprised of similar front and rear slide blocks 270 and 272, respectively, and a connecting brace 274 rigidly attached at each end to slide blocks 270 and 272, is slidably mounted on mounting shafts 264 and 266. A follower guide 276 is transversely and securely mounted in brace 274 and engages a longitudinally extending slot or cam groove (not shown) in cam 230. The cam groove in cam 230 is such that as cam 230 rotates, follower guide 276 and hence slide assembly 268 is reciprocately driven in a forward and rearward direction. Slide blocks 270 and 272 have vertical bore therein for slidably receiving walking beam supporting shafts 256 and 254, respectively. Hence, walking beam 204 is reciprocately driven in a horizontal longitudinal direction by slide assembly 268.

The vertical distance walking beam 204 is moved must be precisely repeated each cycle so that the die block 178 will only engage the exact, predetermined number of laminates 50 on the bottom of the supply stack in magazine 100. The vertical movement of walking beam 204 is determined by the multiplying effect of cam follower 240 and the axial distance that cam groove 252 travels in cam 232. The accuracy of the vertical movement is assured by limiting the vertical travel of cam bar 258 with the lower surface of slide blocks 270 and 272.

It can be seen from the foregoing that the upper surface of walking beam 204 is always raised to the same vertical height. The maximum vertical height to which the upper surfaces of die blocks 178 for dispensing stations 21 through 26 is raised is determined by both the combined heights of die block 178 and riser block 212 and the height to which walking beam 204 is raised. In addition, as the pile of dispensed laminates gets higher by the addition of laminates from successive dispensing stations, it can also be appreciated that the height of the die block 178 must successively increase at each dispensing station. In this manner the previously formed pile of laminates can be retained on walking beam 204 and die block 178 can still extend a sufficient distance above the top of the pile into the central openings 56 of the predetermined number of laminates 50. To compensate for the larger vertical heights of die blocks 178, the height of riser block 212 on which die block 178 is mounted must successively decrease at each dispensing station.

IV. Controlling Apparatus

Figure 12:
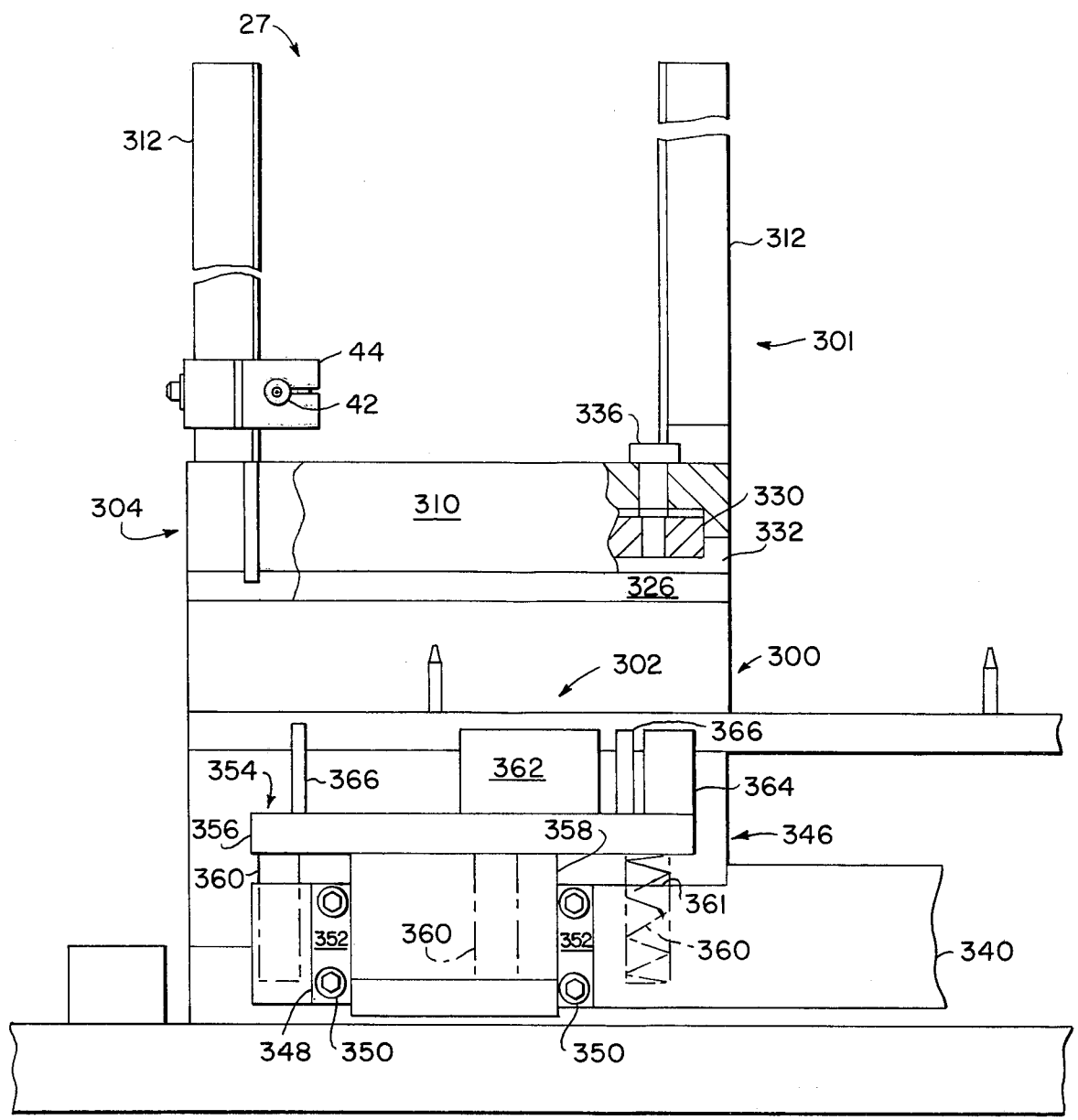
FIG. 12 is a side elevational view, with parts removed, of laminate dispensing station 7 showing the means for controlling the number of plates added by this station.
Figure 13:
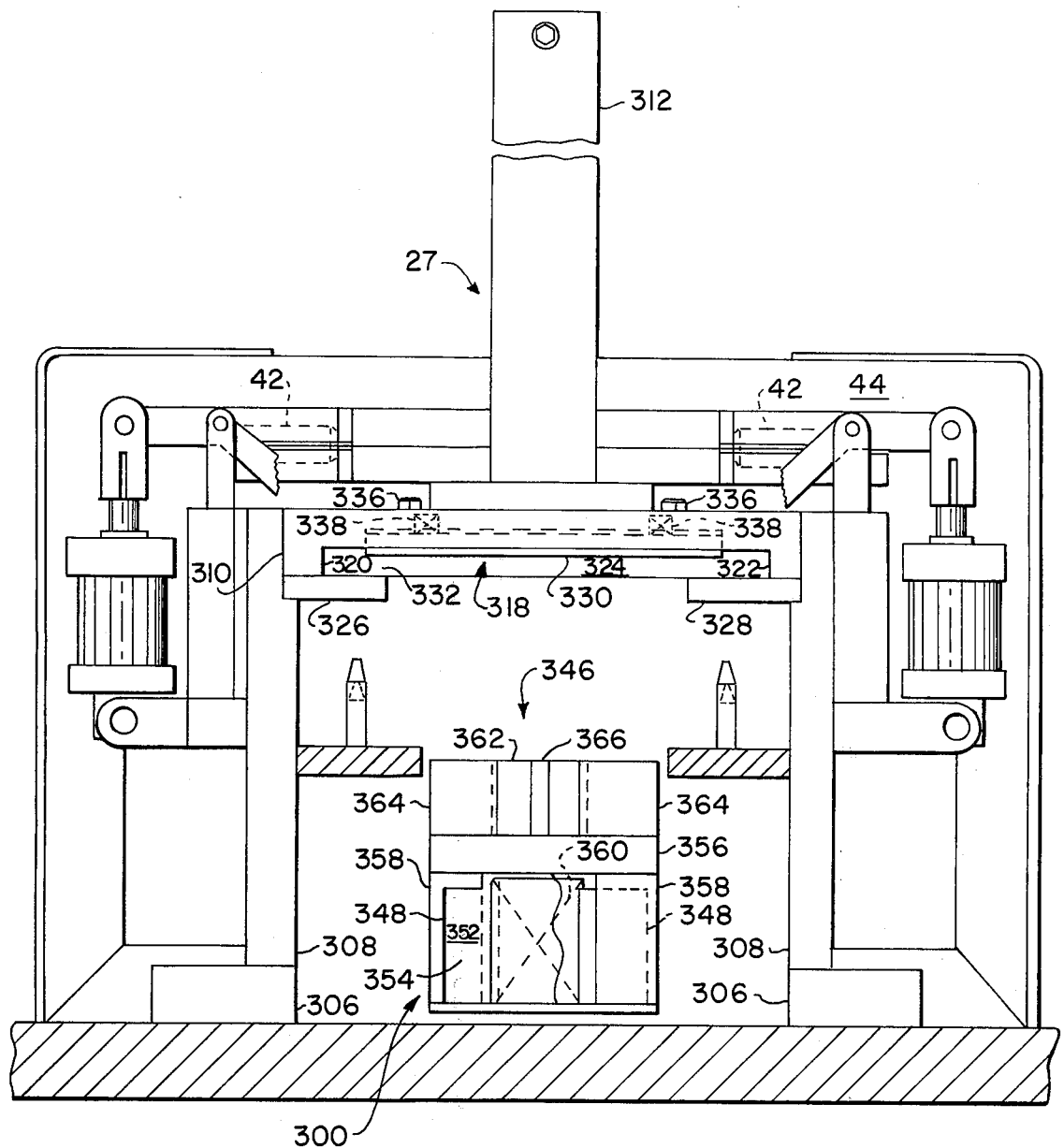
FIG. 13 is an end elevational view of laminate dispensing station 7.

The precise height of the stack of laminates formed at dispensing stations 21 through 26 is determined at dispensing station 27. A sufficient number of additional laminates is added to a predetermined number of laminates, such that the height of all of the laminates dispensed from dispensing station 27 when added to the height of the stack of laminates transported thereto produces the precise desired height of the completed stack of laminates. The means for controlling the number of laminates 50 added by the last dispensing station 27 for producing a stack having a predetermined height is depicted in general at 300 in FIGS. 12 and 13. As mentioned above, the desired height of the stack of laminates is precisely one inch. It must be understood, of course, that the stack height of the stack assembled by stacking machine 20 does have a tolerance and that a zero tolerance of the stack height is neither possible nor accomplished by the present apparatus. Nevertheless, because of the relatively large number of laminates being dispensed and the tolerances for each laminate's thickness, an assembled stack has a tolerance error much smaller than the individual tolerance for each laminate.

Dispensing station 27 is quite similar in construction to the other six dispensing stations and includes a magazine 301 for storing a vertical stack of a plurality of laminates 50 and a means generally denoted 302, for dispensing the laminates therefrom. Magazine 301 comprises a inverted U-shaped base 304 that includes a foot plate 306 mounted to support table 32, two side plates 308 and an upper base plate mounted on and transversely extending between side plates 308. Two vertical stanchions 312 are rigidly mounted at the lower ends thereof to the top of base plate 310.

Figure 14:
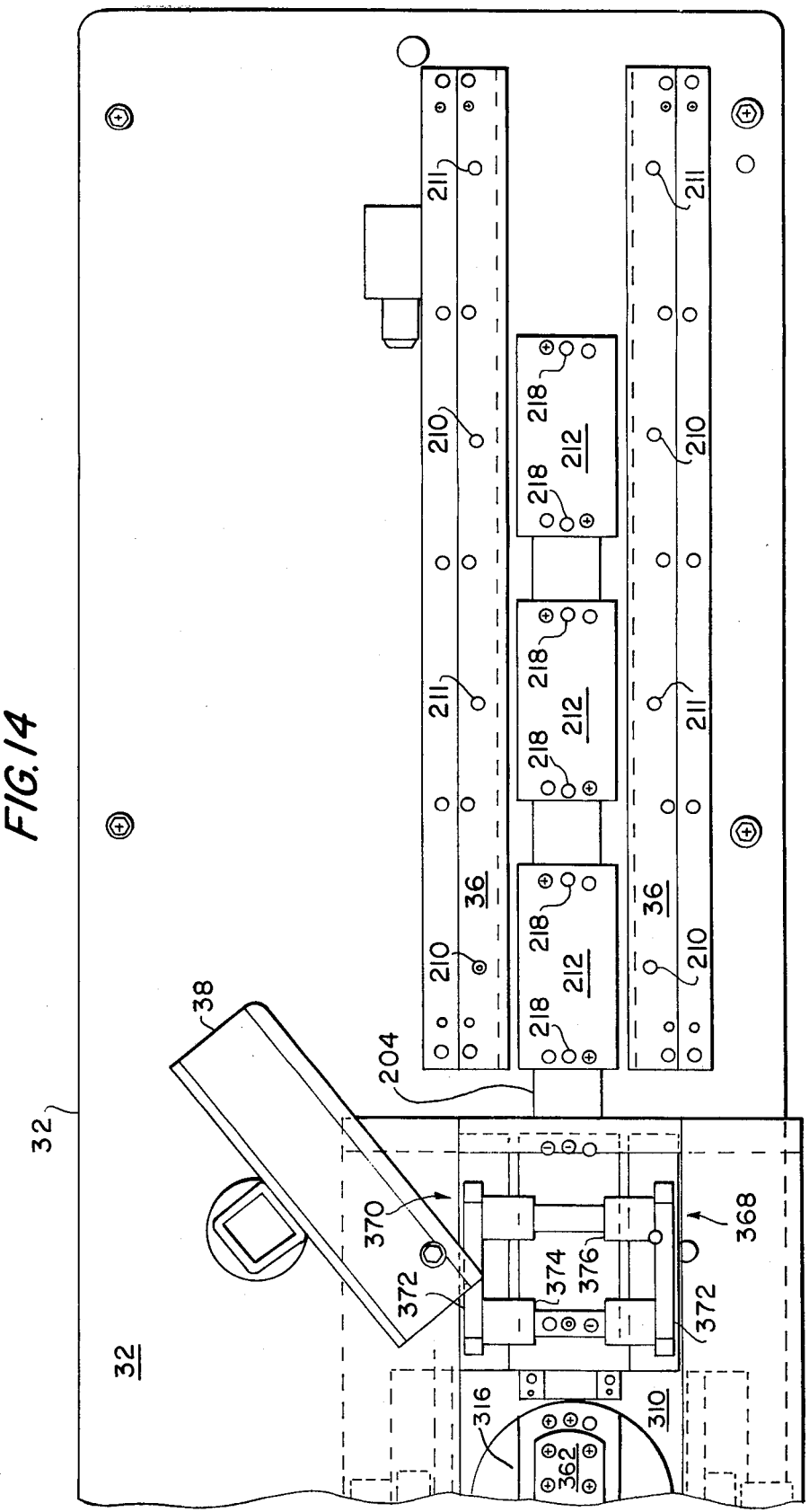
FIG. 14 is a top plan view taken along lines 14—14 in FIG. 1 and showing station 7 and the receiving platform for the completed pile.

Base plate 310 is functionally similar to base plate 110 of the other dispensing stations and as shown in FIG. 14, has a large central circular orifice 316 therein that has a slightly larger diameter than the diameter of laminates 50. A bottom section 318 of base plate 310 is recessed between lines tangent to each side of orifice 316 forwardly to the edge of base plate 310, thereby forming guide rails 320 and 322 and a rear guide plate 324, the lower surfaces of which are all coplanar. Two longitudinally extending support bars 326 and 328 are rigidly mounted along either side of base plate 310 to guide rails 320 and 322. The sides of support bars 326 and 328 extend transversely inwardly to cover an arcuate section of orifice 316 for supporting the bottom of the stored stack of laminates in dispensing station 27. A cut-off blade 330 is mounted to base plate 310 and extends downwardly into a slot 332 defined by the bottom of recessed bottom section 318 and the tops of support bars 326 and 328.

Although base plate 310 is functionally similar to base plate 110 of the other dispensing stations, base plate 310 differs in two important respects. Firstly, the depth of recessed bottom section 318 is much larger, thereby resulting in a bigger slot so that a larger number of laminates can be dispensed therethrough. Secondly, cut-off blade 330 is resiliently mounted inside base plate 310 so that the height of slot 332 can be varied and the total number of laminates dispensed through slot 332 can be controlled. Cut-off blade 330 depends in a forwardly located recess 334 in recessed bottom section 318 of base plate 310 and is supported therein by two bolts 336. Bolts 336 are slidably mounted in and supported by base plate 310, extending through and slidable in corresponding bores in the base plate, and are threaded into the top of cut-off blade 330. Two springs 338 are mounted in recess 334 above cut-off blade 330 and resiliently urge cut-off blade 330 downwardly. Thus, a predetermined number of plates, determined by the distance from the bottom of cut-off blade 330 to the top of support bars 324 and 326, can always be dispensed through slot 332.

As mentioned above, the transporting means for last dispensing station 27 is walking beam assembly 203. Walking beam assembly 203 comprises a walking beam 340 and stationary side rails 342 and 344 which are substantially identical to walking beam 204 and rails 206 and 208 of walking beam assemblies 201 and 202.

Resiliently mounted on walking beam 340 is a laminate dispensing assembly 346. Dispensing assembly 346 comprises two U-shaped gibs 348 (only one of which is shown) rigidly mounted to corresponding sides of walking beam 340 with bolts 350 such that the sides 352 of gib 348 extend transversely outwardly from walking beam 340, thereby defining a recess therebetween. An inverted U-shaped slide 354, comprised of a top riser block 356 and depending sides 358, straddles walking beam 340 and is resiliently mounted in the recesses defined by gib sides 352. Three coil springs denoted 360, mounted in three corresponding bores 361 located in the top of walking beam 340, engage the bottom of riser block 356 and provide a resilient mounting for slide 354. Rigidly mounted on top of riser block 356 is a die block 362 for engaging the laminates to be dispensed and for dispensing the laminates through slot 332. Two cylindrical measuring blocks 364 are rigidly mounted at the forward end on either side of riser block 356 and hence are rigidly mounted with respect to die block 362. Each cylindrical measuring block 364 has a height that is the desired height of the assembled stack of laminates plus the height or thickness of support bars 326 and 328. Two fore and aft locator pins 366 are mounted on riser block 356 for receiving and keeping aligned the transported stack of laminates.

Laminate dispensing assembly 346 is longitudinally located on walking beam 340 such that when the walking beam is in its rearwardmost position, the dispensing assembly is directly below dispensing station 27. Die block 362, and locator pins 366 are located on riser block 356 such that when walking beam is in the rearwardmost position thereof, they are respectively directly below central opening 56 and side openings 58 of laminate 50, and measuring block 364 is located on riser block 356 such that it is directly below cut-off blade 330.

Figure 15:
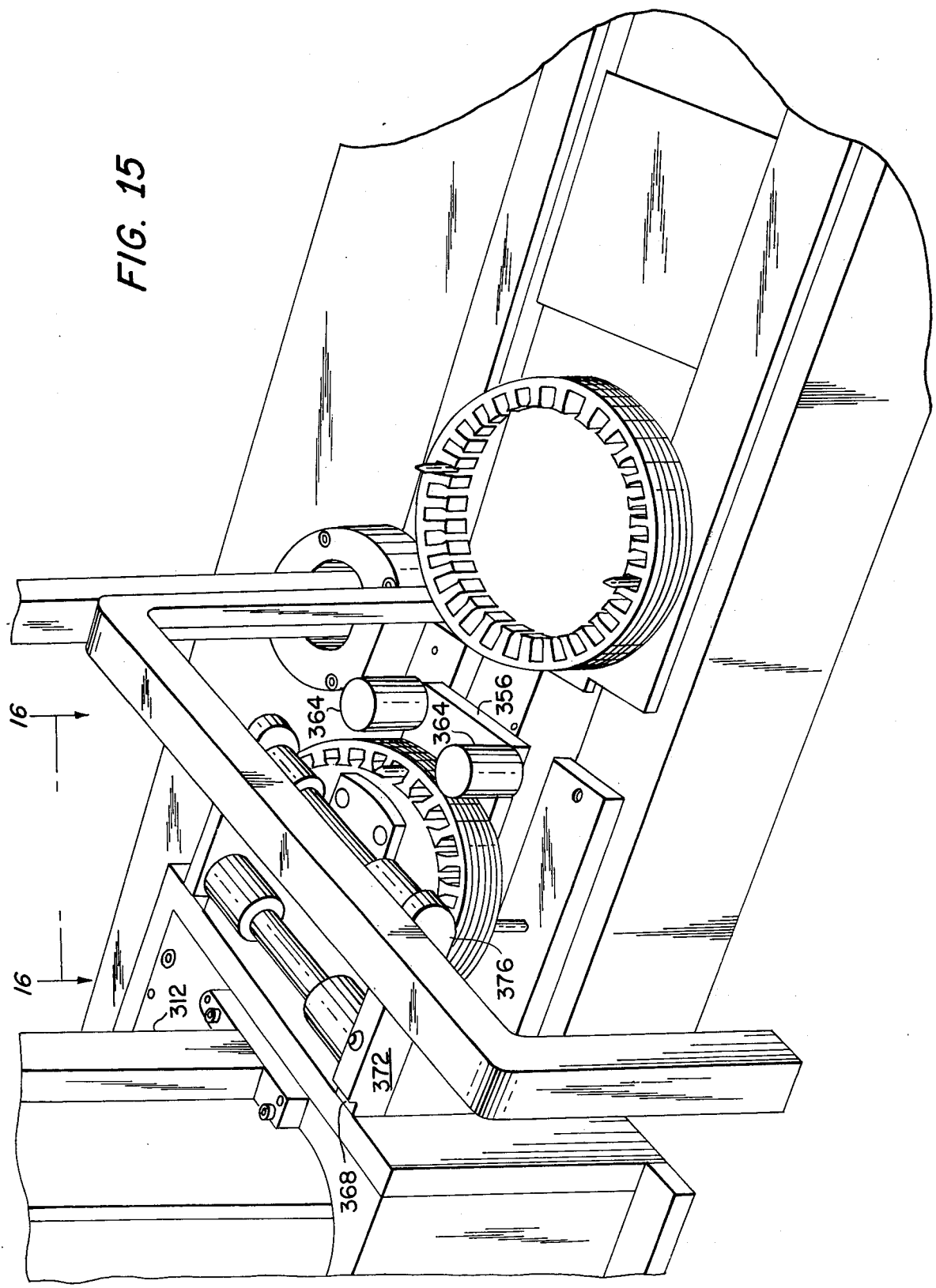
FIG. 15 is a perspective view of station 7.
Figure 16:
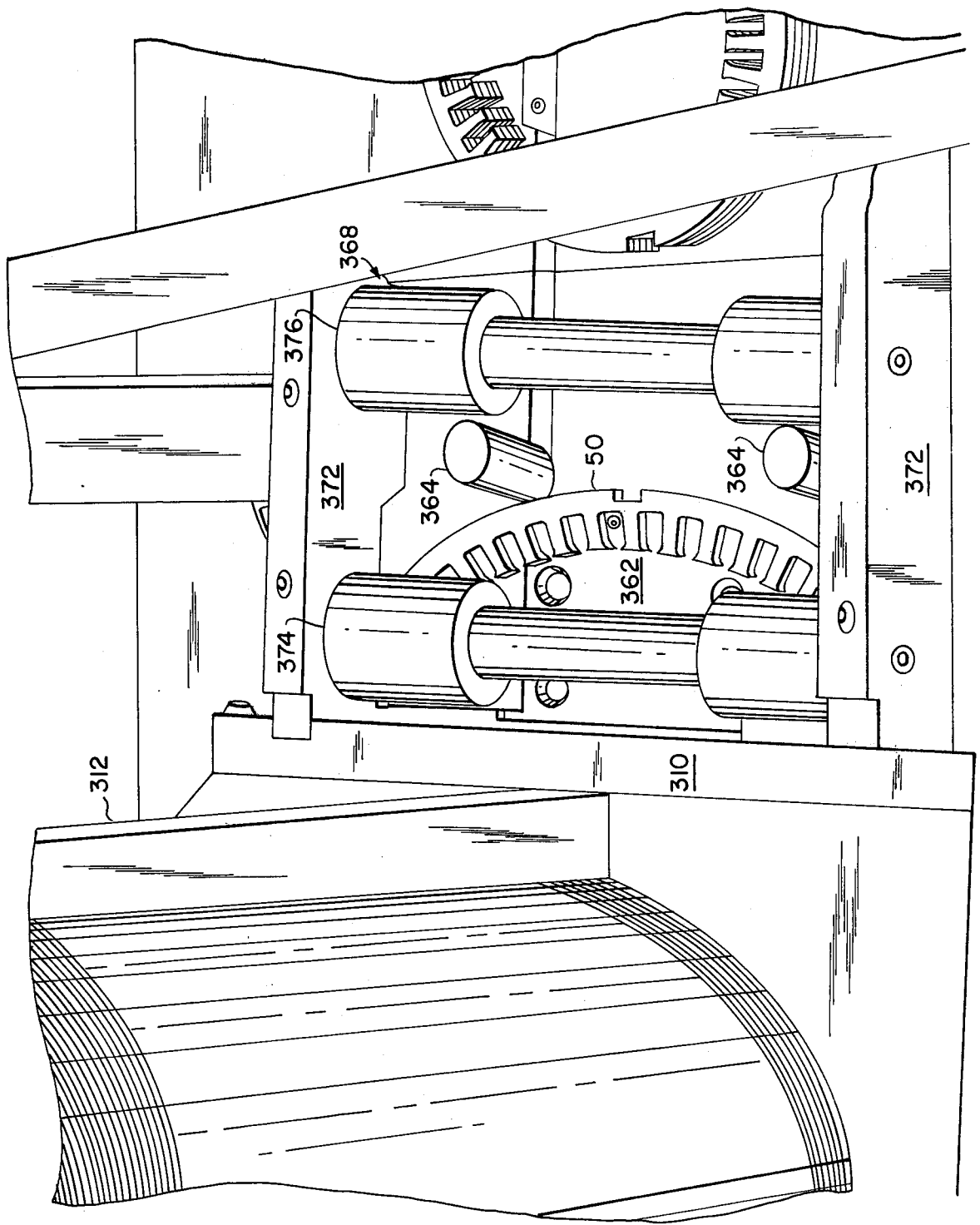
FIG. 16 is a perspective view taken generally from the top along lines 16—16 of FIG. 15 showing the laminate leveling means of station 7.
Figure 17:
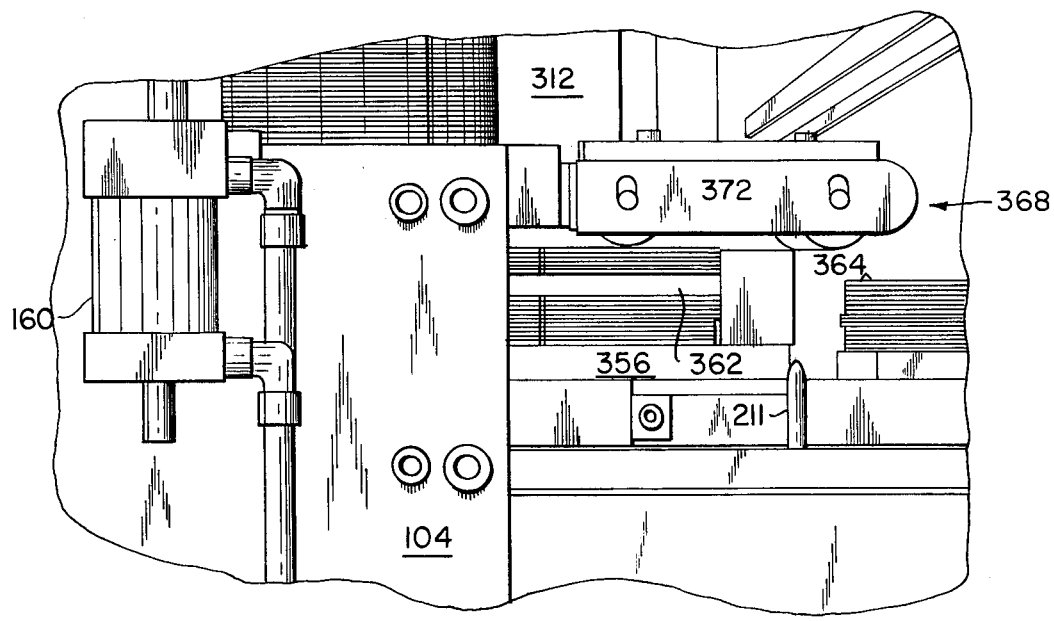
FIG. 17 is a perspective view taken from the side of station 7 showing the laminate leveling means in engagement with the laminates being dispensed from station 7.

Dispensing station 27 also includes a laminate keeping means or leveling and guiding means 368 that is somewhat different from leveling and guiding means 140 of dispensing stations 21 through 26 and is depicted in FIGS. 15, 16 and 17. Because of the larger number of laminates being dispensed and the greater total weight thereof and because of the variable height of slot 332, it is necessary that leveling and guiding means 140 have greater flexibility and versitility. Leveling and guiding means 368 comprises a mounting frame 370 rigidly mounted at one end to base plate 310 and extending horizontally in a forward longitudinal direction therefrom. Mounting frame 370 includes a pair of parallel, spaced apart elongate members 372. Rotatably mounted in and extending between members 372 in a substantially horizontal plane are two rollers 374 and 376. The bottoms of rollers 374 and 376 are located coplanar with the bottom of recessed bottom section 318 and engage the top laminate being dispensed.

Controlling means 300 controls or limits the number of laminates dispensed from dispensing station 27 as follows. For every possible height of the stack of laminates transported to dispensing station 27, walking beam 340 moves upwardly a precise, predetermined distance with the top thereof attaining the same height during each cycle of operation. In a first extreme example or case, where no laminates have been added by the previous dispensing stations, and hence there are no laminates on locator pins 366, as walking beam 340 moves upwardly the tops of measuring blocks 364 strike the bottom of cut-off blade 330. As walking beam 340 continues moving upwardly to its maximum height, cut-off blade 330 is pushed upwardly the maximum distance against the spring force from springs 338. Springs 338, which provide the resiliency for cut-off blade 330, are weaker than springs 360, which resiliently mount dispensing assembly 346. Thus, by properly selecting the critical distances between the top of riser plate 356 and the bottom of support bars 326 and 328 and between the top of measuring block 364 and the bottom of cut-off blade 330, dispensing assembly 346 is only slightly depressed upon the continued upward movement of cut-off blade 330 as a result of the reaction force exerted by springs 338 through cut-off blade 330 and measuring blocks 364 to riser block 356.

In a second extreme case, only the predetermined minimum number of laminates are needed to be added by dispensing station 27 to produce a pile having the desired height. As walking beam 340 moves upwardly, the top of the stack of laminates on locator pins 366 strikes the bottom of support bars 326 before measuring blocks 364 engage cut-off blade 330. Upon continued upward movement of walking beam 340 to its maximum height, dispensing assembly 346 is pushed downwardly the maximum distance against the spring force from springs 360. The amount of permissible downward travel of dispensing assembly and the aforementioned critical distances are selected so as to permit walking beam 340 to attain its maximum height without measuring block 364 contacting cut-off blade 330. Thus, when walking beam 340 begins its forward movement, die block 362 has been inserted into the central openings 56 of only the predetermined minimum number of laminates. Consequently only this minimum number of laminates is dispensed through slot 332, cut-off blade 330 preventing any other laminates from being dispensed.

In the usual case, however, it is necessary to add some laminates to the predetermined minimum number of laminates. In this case, both dispensing assembly 346 and cut-off blade 330 are depressed and the number of additional laminates added is determined by the relative spring pressures of springs 338 and 360 and the height of measuring block 364. Thus, in summary, the height to which die block 362 is raised and the minimum height of slot 332 determine the minimum number of laminates being dispensed; and the height to which measuring blocks 364 are raised, and consequently the height that cut-off blade 330 is lifted, determines the number of additional laminates to be added to the aforesaid minimum number and for limiting the number of added additional plates to the determined number.

It is noted that other shapes and configurations are possible of the parts comprising dispensing assembly 346 and controlling means 300. For example, measuring blocks 364 could be simply one centrally located block or a single block extending across the transverse distance of riser plate 356 and having an arcuate trailing end so as to generally conform to the shape of the adjacent stack of transported laminates.

V. Operation

The operation of laminate stacking machine 20 for assembling a stack of laminates having a precise height is as follows. It is assumed that stacking machine 20 has been in operation for some time and that a full supply of thin laminates are stored in a first orientation and dispensing stations 21 through 24, a supply of thick laminates are stored in a first orientation in dispensing station 25 and in a second orientation in dispensing station 26, and a supply of thin laminates in a second orientation are stored in dispensing station 27. A cycle of machine operation is defined as one complete operation of walking beam apparatus 28 in which the walking beam, beginning at a lower rearward position, travels upwardly to an upward rear position, longitudinally forward to a forward upper position, downwardly to a downward forward position, and finally longitudinally rearwardly to the starting position. A total of 13 complete cycles of machine operation are required to assemble a stack having the desired height.

During the first cycle of operation, walking beam 204 moves vertically upwardly and die block 178 for station 21 is inserted into the central opening 56 of the lower three laminates stored therein. As walking beam 204 forwardly, die block 178 pushes the lower three laminates 50 in station 21 through slot 138 and onto locator pins 216 and around die block 178. At the completion of the forward motion of walking beam 204, the pile of three dispensed laminates is located thereon directly above the forward set of rail locator pins 211. Walking beams 204 then travels downwardly depositing the stack of three laminates on forward rail locator pins 211 on the way. Rails 206 and 208 are vertically located a sufficient distance above the lowest position of walking beam 204 so that the laminates will be completely removed from engagement with beam locator pins 216 and walking beam 204 can clear the laminates during the rearward movement thereof. Finally, walking beam 204 travels rearwardly to its starting position where the forward locator pins 218 thereon are positioned directly beneath the deposited pile of laminates. The next cycle of machine operation results in this pile being transferred from the forward rail locator pins 211 of dispensing station 21 to the rear rail locator pins 210 of dispensing station number 2.

Figure 18:
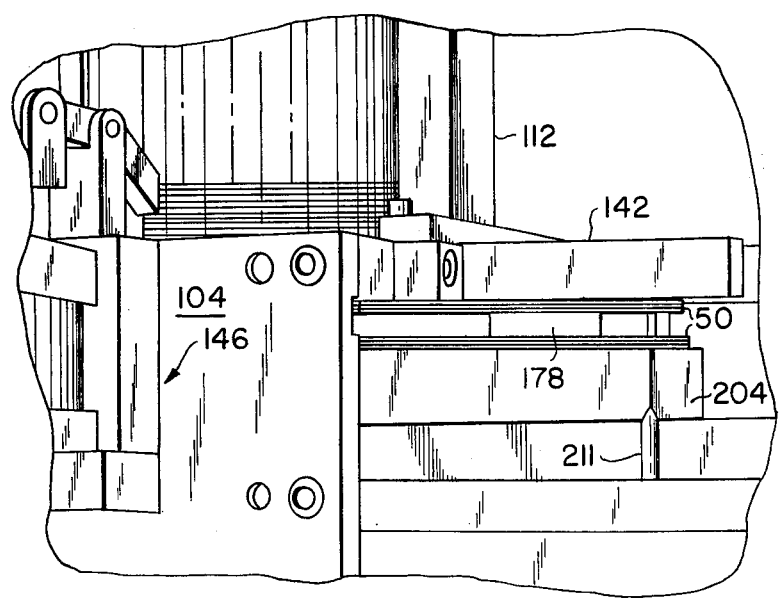
FIG. 18 is a perspective view taken from the side showing the engagement of the laminate leveling means of one of stations 1 through 6 in engagement with laminates being dispensed therefrom.

As shown in FIG. 18, the third cycle of machine operation involves the walking beam 204 picking up the deposited laminates dispensed from dispensing station 21 and adding to this pile three more laminates being dispensed from dispensing station 22. As shown in FIG. 18, there is a space between the first group of laminates and the laminates being presently dispensed. As the stack of laminates being dispensed is being moved through slot 138, the stack is not supported at the forward end thereof and hence when the trailing end of the stack is exiting slot 138 the stack of laminates tends to fan outwardly. It is a function of the laminate leveling and guiding means 140 to engage the uppermost laminate being dispensed and to maintain at least this laminate in a horizontal plane. It has been found that there is no interference in placing the stack of laminates being dispensed onto beam locator pins 216 so long as the uppermost laminate is maintained in a substantially horizontal plane during the dispensing thereof. In fact, it is possible that a downward fanning of the stack of laminates being dispensed actually assists the engagement of locator pins 216 into side openings 58 of the laminates.

The aforementioned transfer of the stack of laminates being formed is substantially the same for all of the remaining dispensing stations except for the last dispensing station 27. Thus, dispensing stations 21 through 26 each dispense a predetermined number of plates with a particular orientation thereof and add the dispensed plates onto a stack transported from the previous station and transport the stack to the last dispensing station 27. The operation of last dispensing station 27 has previously been described and will not be repeated here.

VI. Summary

Thus, a laminate stacking machine and method have been described wherein a stack of laminates having a precise height is mechanically and automatically assembled from a plurality of individual laminates whose thicknesses and distribution of thicknesses vary throughout the plate. Although the invention has been described in detail with respect to an exemplary embodiment thereof, it will be understood by those of ordinary skill in the art that variations in modifications may be effected within the scope and spirit of the invention.

We claim:

1. Apparatus for making a stack having a predetermined height from a plurality of individual plates having varying thicknesses and uneven distribution of thickness throughout the plate, the apparatus comprising:

a plurality of plate dispensing station means including a first dispensing station means and a second dispensing station, each said plate dispensing station means dispensing plates from the bottom of a stored stack of a plurality of plates and said second dispensing station means dispensing a pile of plates at a time;

transporting means for serially transporting a stack of plates at least from said first dispensing station means to said second dispensing station means and for receiving and adding to the transported stack of plates additional plates from the station means; and means for controlling the number of plates in said dispensed pile added by the second dispensing station means for producing a final stack having a predetermined height.

2. Apparatus as claimed in claim 1 wherein said second plate dispensing station means is the last dispensing station means and each of said dispensing station means except the last dispensing station means dispenses each time a pile of plates having a predetermined number of plates, and wherein said controlling means controls the number of plates added to the transported stack by said last dispensing station means.

3. Apparatus as claimed in claim 2 wherein said plurality of dispensing station means include a first dispensing station means, at least one intermediate dispensing station means and a last dispensing station means, said at least one dispensing station means for dispensing plates having an average thickness different from the average thickness of the plates at said first dispensing station means.

4. Apparatus as claimed in claim 1 wherein said transporting means comprises at least one walking beam assembly which includes a pair of parallel spaced apart elongated, stationary rails, a movable walking beam located in the space between said rails, and means for moving said walking beam in a generally rectangular path when viewed in elevation such that the movement of said walking beam comprises in sequence an upward movement, a forward movement, a downward movement, and a rearward movement.

5. Apparatus as claimed in claim 4 wherein said walking beam assembly further comprises means for holding the pile of plates in vertical alignment during the transportation thereof, said holding means comprising a first pair of vertical rail guides for removably retaining the pile on said rails at a first location, each said rail guide of said first pair of guides mounted on a corresponding rail in transverse alignment with the other rail guide; a first pair of vertical beam guides for removably retaining the pile on said beam, said beam guides mounted on said beam in longitudinal alignment therewith such that when said beam is in a first position, said beam guides are longitudinally spaced on either side of said first pair of rail guides; and a second pair of vertical rail guides for removably retaining the pile on said rails at a second location, each said rail guide of said second pair being mounted on a corresponding rail in transverse alignment with the other rail guide, said second location being longitudinally spaced from said first location an amount such that when said beam is in a second position, said first pair of beam guides are longitudinally spaced on either side of said second pair of rail guides.

6. Apparatus as claimed in claim 5 wherein said plurality of dispensing station means include a first dispensing station means, at least one intermediate dispensing station means, and a last dispensing station means and wherein said transporting means comprises at least two longitudinally aligned walking beam assemblies, said walking beam assemblies comprising corresponding pairs of horizontal rails in mutual longitudinal alignment, the upper surfaces of which have substantially the same vertical height, corresponding walking beams, corresponding plate holding means and corresponding beam moving means, and wherein said transporting means further comprises means for coordinating the movements of said walking beams.

7. Apparatus as claimed in claim 4 wherein each said plate dispensing station means comprises a magazine for storing a vertical stack of a plurality of individual plates and means for dispensing said plates from the bottom of the stored stack onto the top of the stack being transported by said walking beam.

8. Apparatus as claimed in claim 7 wherein said walking beam is located vertically below said magazines and each said magazine comprises means for aligning said plates in a substantially collinear stack and said dispensing means includes a slot defining member mounted to the bottom of said magazine, said slot having a height such that only a predetermined number of plates can pass therethrough; said dispensing means further includes means for discharging the plates through the slot such that said walking beam receives the discharged plate.

9. Apparatus as claimed in claim 8 wherein the plates comprise annular plates having a central orifice and wherein said discharge means comprises a block mounted on said walking beam, said block having a maximum diameter smaller than the diameter of the central orifice of the plate, said block being located on said walking beam and having a height such that during the upward movement of said walking beam said block is positioned vertically upwardly inside the orifices of the number of plates to be discharged and during the forward movement of said walking beam slides the plates being discharged through said slot.

10. Apparatus as claimed in claim 8 wherein said walking beam assembly further comprises means for holding the pile of plates in vertical alignment during the transportation thereof, said holding means comprising a first pair of vertical rail guides for removably retaining the pile on said rails at a first location, each said rail guide of said first pair of guides mounted on a corresponding rail in transverse alignment with the other rail guide; a first pair of vertical beam guides for removably retaining the pile on said beam, said beam guides mounted on said beam in longitudinal alignment therewith such that when said beam is in a first position, said beam guides are longitudinally spaced on either side of said first pair of rail guides; and a second pair of vertical rail guides for removably retaining the pile on said rails at a second location, each said rail guide of said second pair being mounted on a corresponding rail in transverse alignment with the other rail guide, said second location being longitudinally spaced from said first location an amount such that when said beam is in a second position, said first pair of beam guides are longitudinally spaced on either side of said second pair of rail guides.

11. Apparatus as claimed in claim 10 wherein the plates comprise annular plates having a central orifice and wherein said discharge means comprises a block mounted on said walking beam, said block having a maximum diameter smaller than the diameter of the central orifice of the plate, said block being located on said walking beam and having a height such that during the upward movement of said walking beam said block is positioned vertically upwardly inside the orifices of the number of plates to be discharged and during the forward movement of said walking beam slides the plates being discharged through said slot and wherein said block is longitudinally located on said beam between said beam guides.

12. Apparatus as claimed in claim 8 wherein said dispensing means further comprises means for leveling and guiding the fed predetermined number of plates as the plates are fed through said slot, said leveling means comprising an elongate member mounted directly above the top of said slot and extending substantially parallel to said beam.

13. Apparatus as claimed in claim 8 wherein said plurality of dispensing stations means include a first set of in-line dispensing station means for dispensing plates having a first average thickness, a second set of in-line dispensing station means longitudinally aligned with said first set of dispensing station means, said second set of dispensing station means for dispensing plates having a second average thickness thicker than said first thickness, and a last dispensing station means longitudinally aligned with said first and second sets of dispensing station means for dispensing plates having the first average thickness.

14. Apparatus as claimed in claim 13 and wherein said transporting means comprises three longitudinally aligned walking beam assemblies comprising corresponding pairs of horizontal rails in mutual longitudinal alignment, the upper surfaces of which are coplanar; corresponding walking beams; corresponding plate holding means; and corresponding moving means, said first walking beam assembly for receiving the transporting plates from said first set of dispensing station means, said second walking beam assembly for receiving and transporting plates from said second set of dispensing station means, and said third walking beam assembly for receiving and transporting plates from only said last dispensing station means; and wherein said transporting means further comprises means for coordinating the moving means of said three walking beams such that all said walking beams move uniformly together and the upper surfaces of said walking beams are kept substantially coplanar during the movement of said walking beams.

15. Apparatus as claimed in claim 4 wherein said walking beam moving means comprises a rotably mounted cam shaft,
   a motor for rotating said cam shaft;
   a first cam means for reciprocatingly moving said walking beam vertically, said first cam means comprising a first cam rigidly mounted on said cam shaft and rotatable therewith, and a substantially angulated cam follower pivotably mounted at the vertex thereof and engaging said first cam at one end thereof;
   a generally U-shaped connecting arm rigidly connected at the upper end to said walking beam and slidably connected at the lower, base end to the other end of said angulated cam follower;
   two slide blocks, the vertical portions of said connecting arm being slidably received in a corresponding vertical bore in a corresponding slide block;
   mounting means for slidably mounting said slide block for movement in a longitudinal direction;
   and second cam means for reciprocatingly moving said walking beam in a longitudinal direction, said second cam means comprising a second cam rigidly mounted on said cam shaft and rotatable therewith, and a cam follower rigidly mounted to said slide blocks and engaging said second cam.

16. Apparatus as claimed in claim 1 wherein each plate dispensing station means comprises a magazine for storing a vertical stack of a plurality of individual plates, means for dispensing said plates from the bottom of the stack and for supplying said plates to said transporting means, and means for positively downwardly urging the plates for feeding the plates to said dispensing means.

17. Apparatus as claimed in claim 1 and further comprising means for dispensing at least a predetermined number of plates from said second dispensing station means; and wherein said controlling means comprises means for determining the number of additional plates to be added to said predetermined number of plates and for limiting the number of added additional plates to the determined number.

18. Apparatus as claimed in claim 7 wherein said dispensing means includes means for keeping the uppermost plates of the plates being dispensed from said magazine in a substantially horizontal plane during the dispensing thereof.

19. Apparatus as claimed in claim 18 and wherein for at least one dispensing station means said dispensing means further includes a slot defining member mounted to the bottom of said magazine, and said keeping means comprises at least one elongated bar mounted to said magazine directly above said slot and extending longitudinally therefrom, said bar having a substantially horizontal planar lower surface for engaging the upper surface of the uppermost plate being dispensed.

20. Apparatus as claimed in claim 18 and wherein for the last dispensing station means said dispensing means further includes a slot defining member mounted to the bottom of said magazine, and said keeping means comprises at least one roller rotatably mounted in a substantially horizontal plane such that the lower surface thereof engages the upper surface of the uppermost plate being dispensed.

21. The apparatus as claimed in claim 4 wherein said transporting means comprises three longitudinally aligned walking beam assemblies comprising corresponding pairs of horizontal rails in mutual longitudinal alignment, the upper surfaces of which are coplanar; corresponding walking beams; corresponding plate holding means; and corresponding moving means, said first walking beam assembly for receiving and transporting plates from only a first set of dispensing station means, said second walking beam assembly for receiving and transporting plates from a second set of dispensing station means, and said third walking beam assembly for receiving and transporting plates from only said last dispensing station mean; and wherein said transporting means further comprises means for coordinating the moving means of said three walking beams such that all said walking beams move uniformly together and the upper surfaces of said walking beams are kept substantially coplanar during the movement of said walking beams.

22. The apparatus as claimed in claim 21 wherein said coordinating means comprises a single rotatably mounted cam shaft, a motor for rotating said cam shaft, three sets of cams mounted on said cam shaft and three sets of cam followers for moving said walking beams in said rectangular paths, one set of cams and cam followers corresponding to each said walking beam.

23. Apparatus for making a stack having a predetermined height from a plurality of individual plates having a varying thickness and uneven distribution of thickness throughout the plate, the apparatus comprising:
   a plurality of plate dispensing station means including a first dispensing station means and a second dispensing station;

transporting means for serially transporting a stack of plates at least from said first dispensing station means to said second dispensing station means and for receiving and adding to the transported stack of plates additional plates from the station means;

wherein said second dispensing station means comprises a magazine for storing a vertical stack of a plurality of individual plates, said magazine comprising a bottom support member for supporting the vertical stack of plates and a slot defining means at the bottom of said magazine for defining a slot and said transporting means discharges the plates from the bottom of the stack through said slot and receives the plates;

and controlling means for controlling the number of plates in the stack of plates dispensed through said slot and added by said second dispensing station means for producing a stack having a predetermined height.

24. Apparatus as claimed in claim 23 wherein said controlling means includes a cut-off blade for varying the size of said slot and hence for controlling the number of plates that can be dispensed therethrough.

25. Apparatus as claimed in claim 23 wherein said dispensing means comprises an engaging means for engaging the number of plates to be dispensed by said dispensing means, and wherein said controlling means limits said engaging means to engage only the requisite number of plates to produce a stack with said predetermined height.

26. Apparatus as claimed in claim 25 wherein said controlling means comprises means for determining the number of plates to be added to produce a stack with said predetermined height, said determining means comprising a rigid measuring block rigidly mounted relative to said engaging means.

27. Apparatus as claimed in claim 25 wherein said transporting means comprises means for vertically moving said engaging means and wherein said controlling means further comprises means for resiliently mounting said engaging means on said moving means.

28. Apparatus as claimed in claim 27 wherein said controlling means includes a cut-off blade for varying the size of said slot and hence for controlling the number of plates that can be dispensed therethrough.

29. Apparatus as claimed in claim 25 wherein said transporting means comprises at least one walking beam assembly which includes a pair of parallel spaced apart elongated, stationary rails, a movable walking beam located in the space between said rails, and means for moving said walking beam in a generally rectangular path when viewed in elevation such that the movement of said walking beam comprises in sequence an upward movement, and forward movement, a downward movement, and a rearward movement, and wherein said controlling means comprises means for resiliently mounting said engaging means on said walking beam.

30. Apparatus as claimed in claim 29 wherein said mounting means also resiliently mounts the stack of plates transported to said last dispensing station means such that the top of the mounted stack engages said bottom support member thereby forcing said mounting means downwardly upon further upward movement of said walking beam and thus limiting the maximum number of plates engagable by said engaging member.

31. Apparatus as claimed in claim 30 wherein said controlling means further comprises a cut-off blade for varying the size of said slot and hence for controlling the number of plates that can be dispensed therethrough.

32. Apparatus as claimed in claim 31 wherein said controlling means further comprises means for resiliently mounting said cut-off blade, and means for representing said predetermined height of said stack, said representing means comprising a rigid measuring block mounted on said mounting means for said engaging means, said block for engaging and raising said resiliently mounted cut-off blade and thereby varying the size of said slot.

33. Apparatus as claimed in claim 31 wherein the resilient force of said mounting means for said engaging means is stronger than the resilient force of said cut-off blade mounting means, thereby ensuring that the top plate of said mounted stack engages said bottom support member.

34. Apparatus for assembling a stack which has a predetermined height using a plurality of individual plates having a varying thicknesses and uneven distribution of thickness throughout the plate, the apparatus comprising a plurality of plate dispensing station means including a first station means and a last station means, each said station means for storing a vertical pile of plates and for dispensing the plates from the bottom of the pile;

transporting means for discharging and receiving the plates from each dispensing station means and for serially transporting the stack of plates between said plurality of station means, and receiving and adding to the stack of plates additional plates from each said station means; and means for measuring the height of the stack and for varying the total number of plates in the stack so that the overall height of the stack has precisely a predetermined value.

35. A method of mechanically and automatically assembling a stack which has a predetermined height from a plurality of individual plates having a varying thicknesses and uneven distribution of thickness throughout the plate, the method comprising:

dispensing a predetermined number of plates having a first orientation in a vertical stack from the bottom of a pile of plates stored at a first dispensing station, serially transporting the stack of plates by a transporting means to at least one intermediate station, dispensing a predetermined number of plates from the bottom of a pile of plates stored at each intermediate station onto the transported stack, transporting the stack of plates to a second dispensing station, measuring the height of the transported stack and determining the number of plates that must be dispensed from said second station to produce a stack having a predetermined height, and dispensing from the bottom of a pile of plates stored at said second station in a second orientation and adding said determined number of plates to said stack of plates transported from said intermediate station whereby at least one of the station means has a pile of plates discharged at a time from the bottom of the pile of stored plates by the transporting means, thereby producing a final stack having a predetermined height.

36. A method as claimed in claim 35 and further comprising storing a vertically stacked supply of plates having said first orientation in said first dispensing station, storing a vertically stacked supply of plates having said second orientation in said last dispensing station, and storing a vertically stacked supply of plates in all of said intermediate stations; and wherein all of said dispensing steps dispensing said plates from the bottom of the respective vertical supply stacks.

37. Apparatus for making a stack having a predetermined height from a plurality of individual plates, the apparatus comprising:
at least one plate dispensing station means;
transporting means for transporting plates from said dispensing station means; and
wherein said plate dispensing station means comprises a magazine for storing a vertical stack of plurality of individual plates, means for dispensing said plates from the bottom of the stack onto said transporting means, and means for positively downwardly urging the plates for feeding the plates to said dispensing means, said plate urging means comprising a pair of pivotable arms for engaging the stack of plates at opposite sides thereof, and a pair of piston means for pivotably moving corresponding ones of said arms into and out of engagement with said plates and wherein each said arm is mounted for pivotal movement in a vertical plane and is comprised of an angular member connected at one end to said piston means and extending substantially horizontal therefrom, said member having a central vertex, and having a roughened edge at the other end thereof for frictionally engaging the plates, and wherein said plate urging means further comprises a resiliently and substantially vertically mounted support slide to which said vertex of said angular member is connected, and means for slidably mounting said slide.

38. Apparatus as claimed in claim 34 wherein said transporting means comprises at least one walking beam assembly which includes a pair of parallel spaced apart elongated, stationary rails, a movable walking beam located in the space between said rails, and means for moving said walking beam in a generally rectangular path when viewed in elevation such that the movement of said walking beam comprises in sequence an upward movement, a forward movement, a downward movement, and a rearward movement and wherein said apparatus further comprises means rigidly mounted to said walking beam for engaging and discharging the plates from the dispensing station means.

39. Apparatus as claimed in claim 38 wherein each said dispensing station means comprises a magazine for storing a vertical stack of a plurality of individual plates, said magazine comprising a bottom support member for supporting the vertical stack of plates and a slot defining means at the bottom of said magazine for defining a slot, said engaging means engaging and dispensing the plates from the bottom of the stack through said slot and onto said walking beam.

40. Apparatus as claimed in claim 38 wherein said measuring and varying means is located at one dispensing station means and comprises a cut-off blade for varying the size of said slot and hence for controlling the number of plates that can be dispensed therethrough.

* * * * *